June 12, 1928.

E. W. GOODWIN 1,672,935

FOLDING MACHINE

Filed Aug. 29, 1925     13 Sheets-Sheet 1

Fig. 1.

WITNESS

INVENTOR
*Edwin W. Goodwin*
BY
ATTORNEYS

June 12, 1928.  
E. W. GOODWIN  
FOLDING MACHINE  
Filed Aug. 29, 1925  
1,672,935  
13 Sheets-Sheet 2

INVENTOR  
EDWIN W. GOODWIN  
BY Knight Bro  
ATTORNEYS

June 12, 1928. 1,672,935
E. W. GOODWIN
FOLDING MACHINE
Filed Aug. 29, 1925 13 Sheets-Sheet 3

WITNESS
Oliver N. Holmes

INVENTOR
EDWIN W. GOODWIN
BY Knight Bros
ATTORNEYS

June 12, 1928.  E. W. GOODWIN  1,672,935
FOLDING MACHINE
Filed Aug. 29, 1925   13 Sheets-Sheet 5
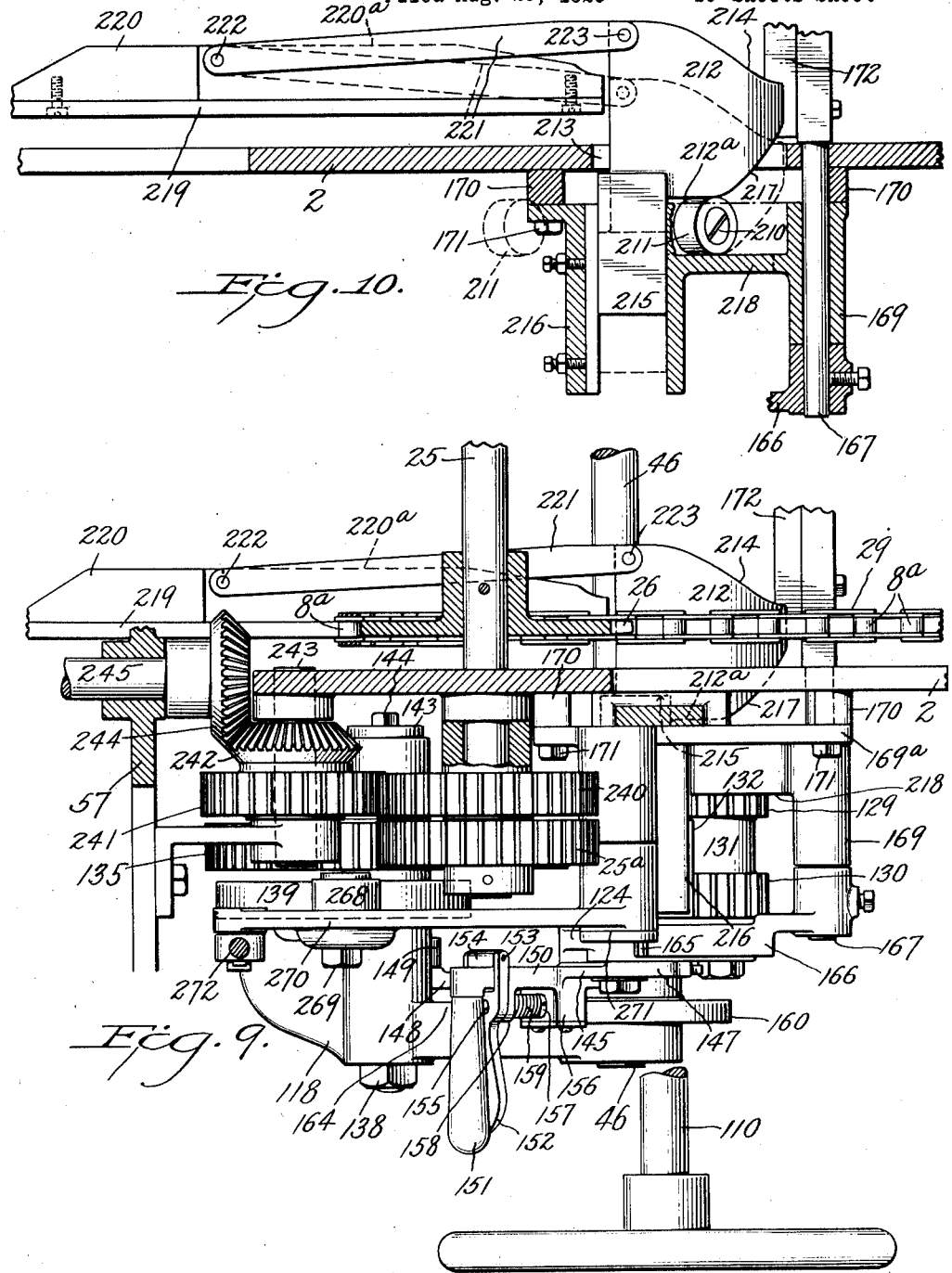
WITNESS
INVENTOR
EDWIN W. GOODWIN
BY Knight
ATTORNEYS

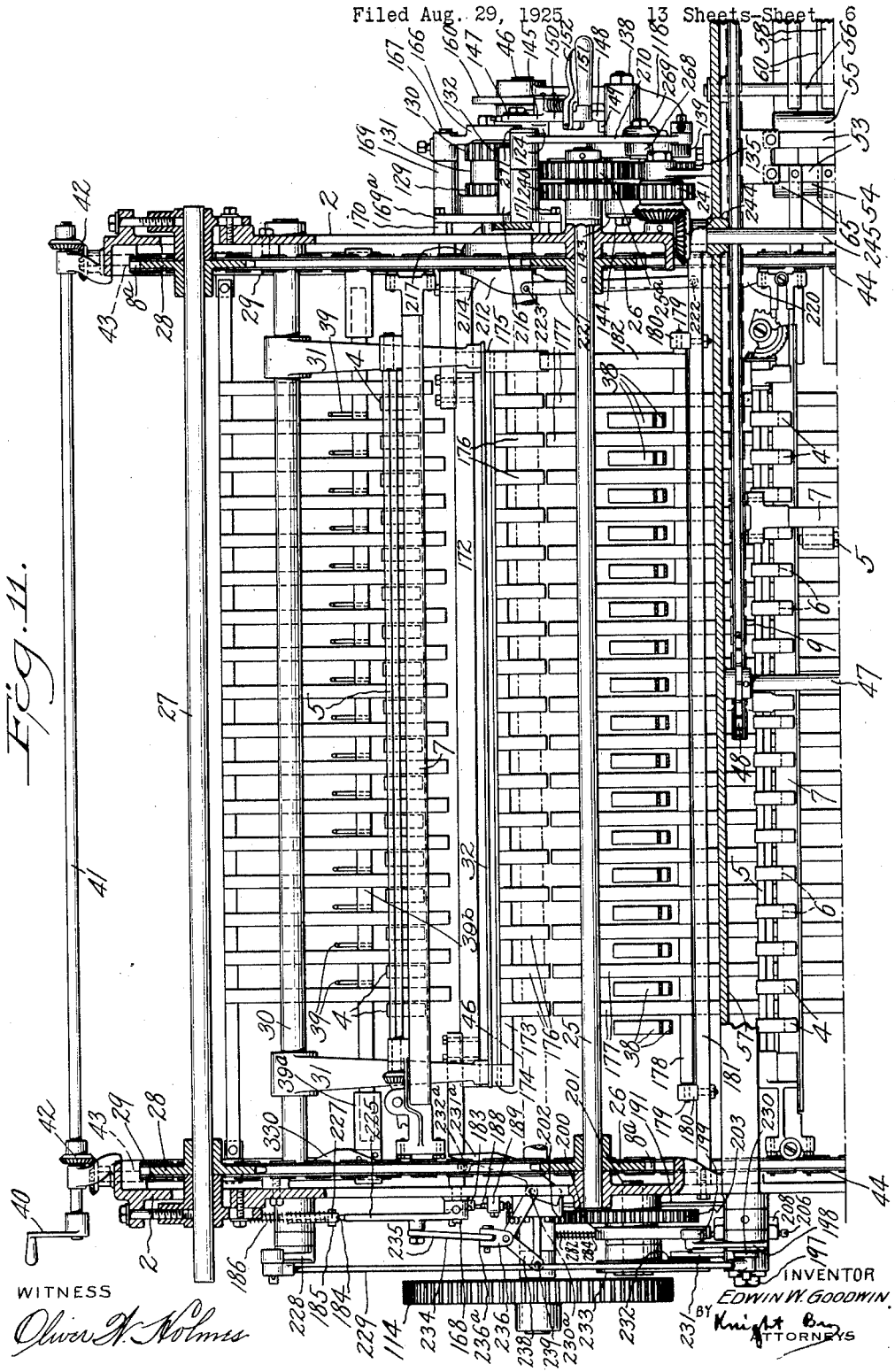

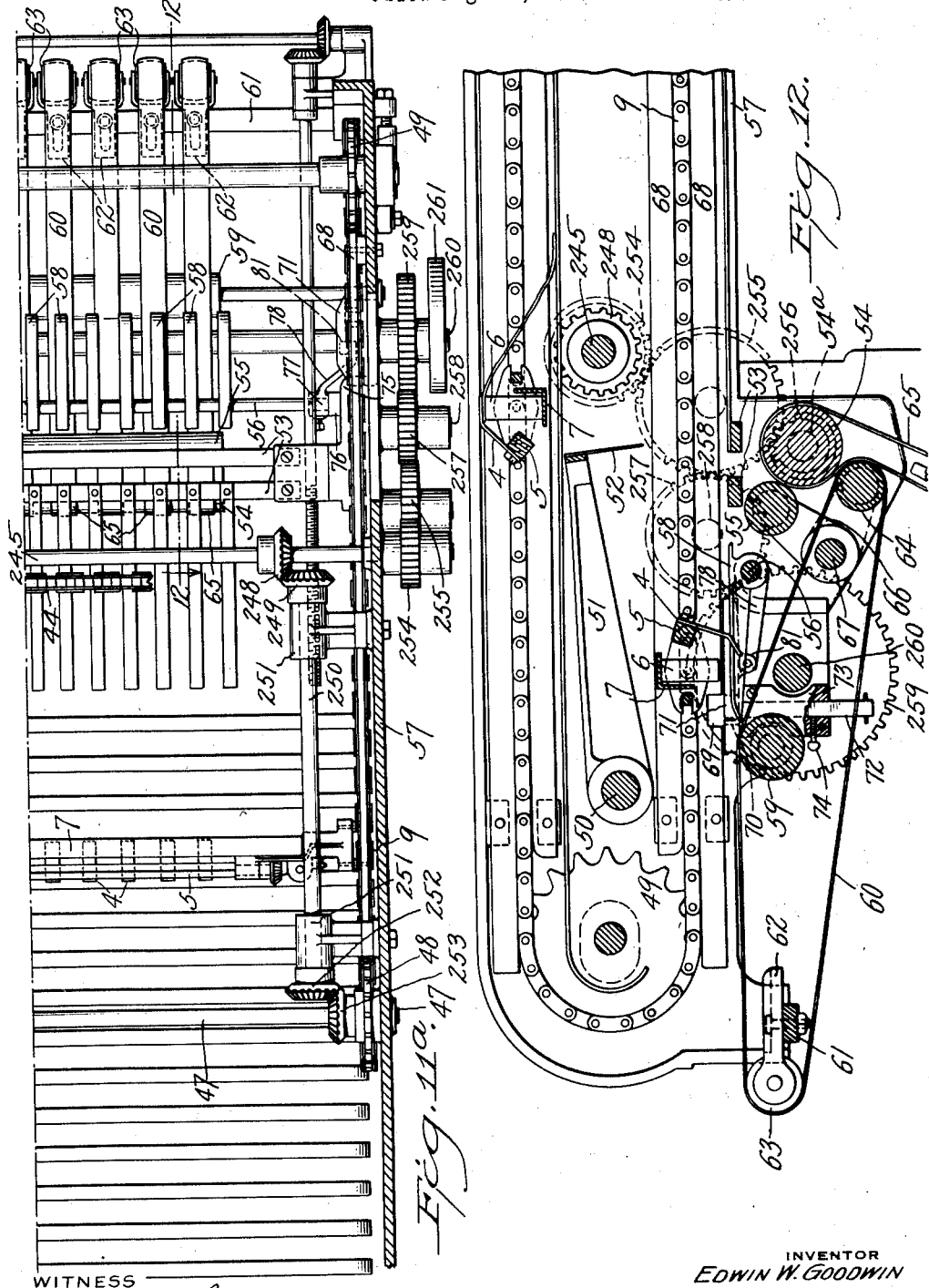

June 12, 1928.  E. W. GOODWIN  1,672,935
FOLDING MACHINE
Filed Aug. 29, 1925   13 Sheets-Sheet 8

WITNESS
Oliver W. Holmes

INVENTOR
EDWIN W. GOODWIN
BY
Knight Bros
ATTORNEYS

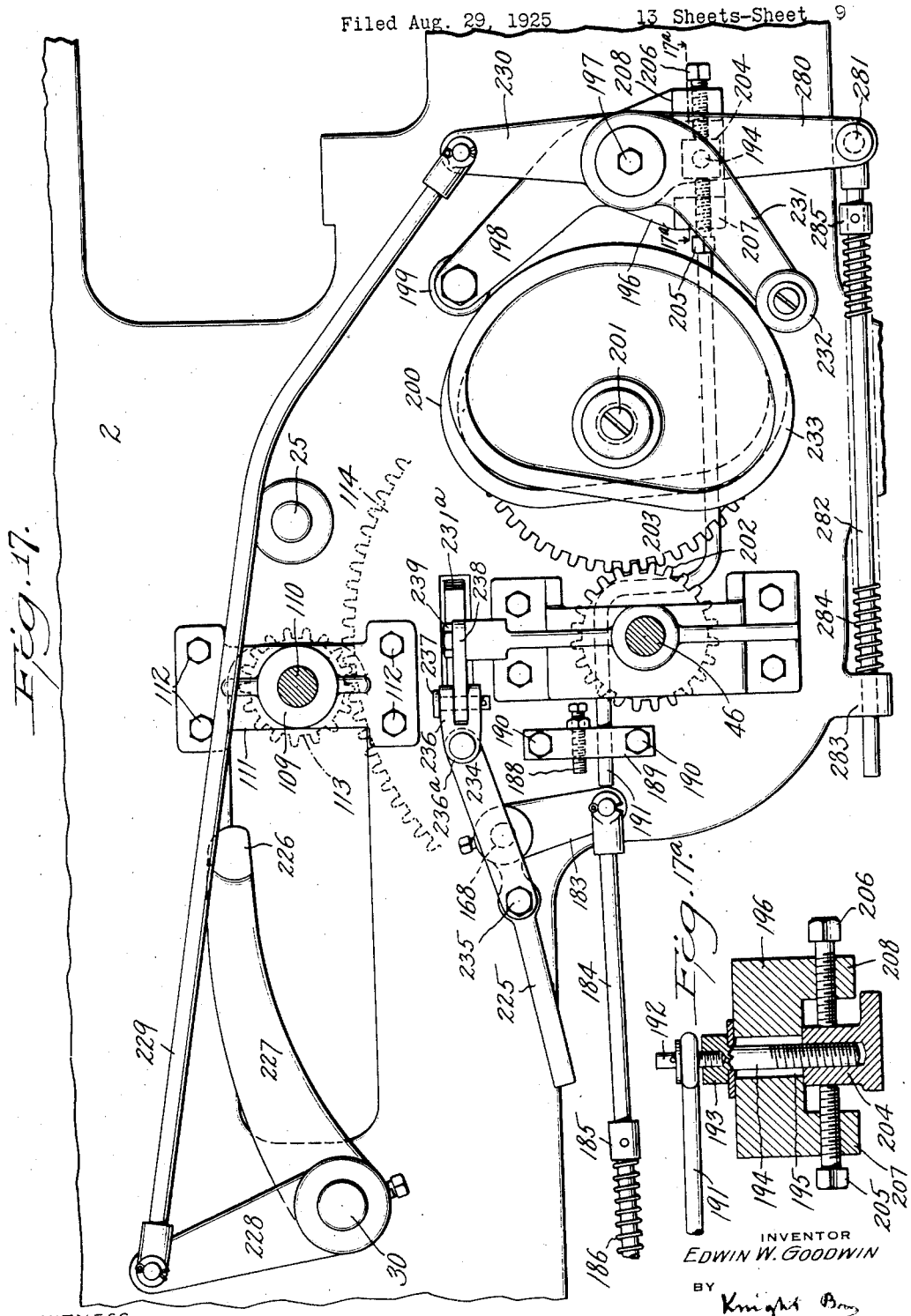

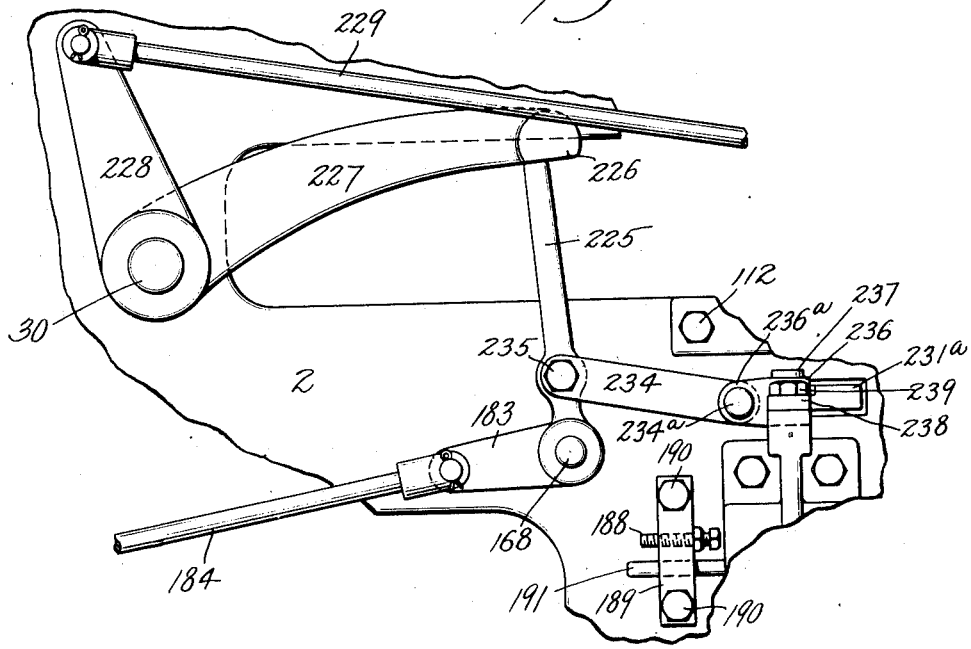
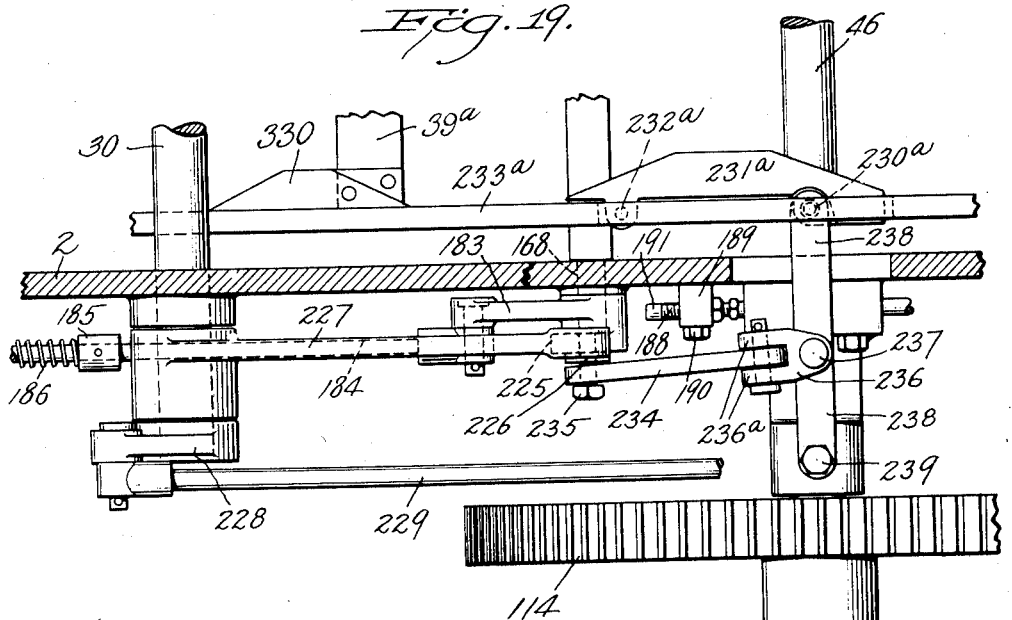

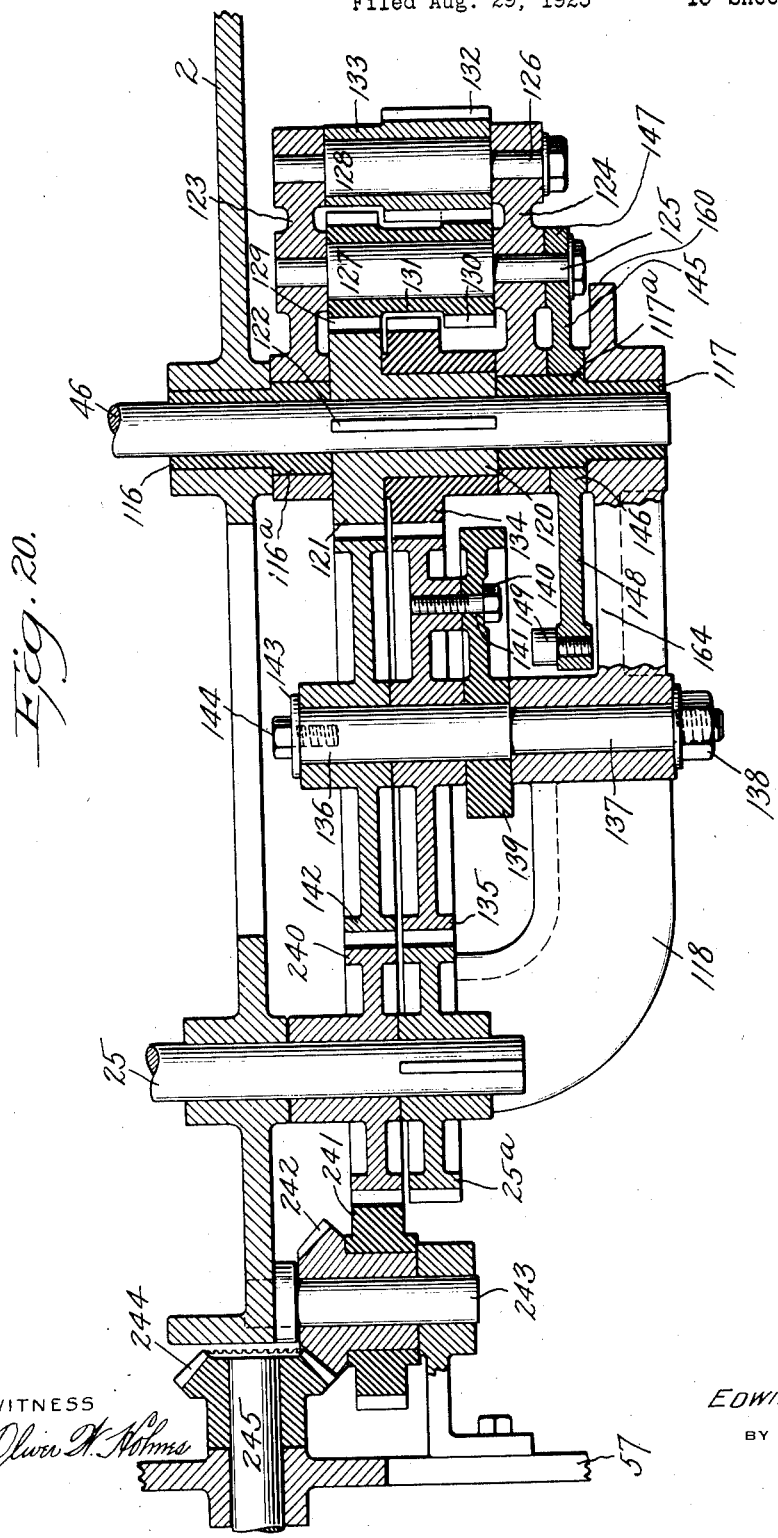

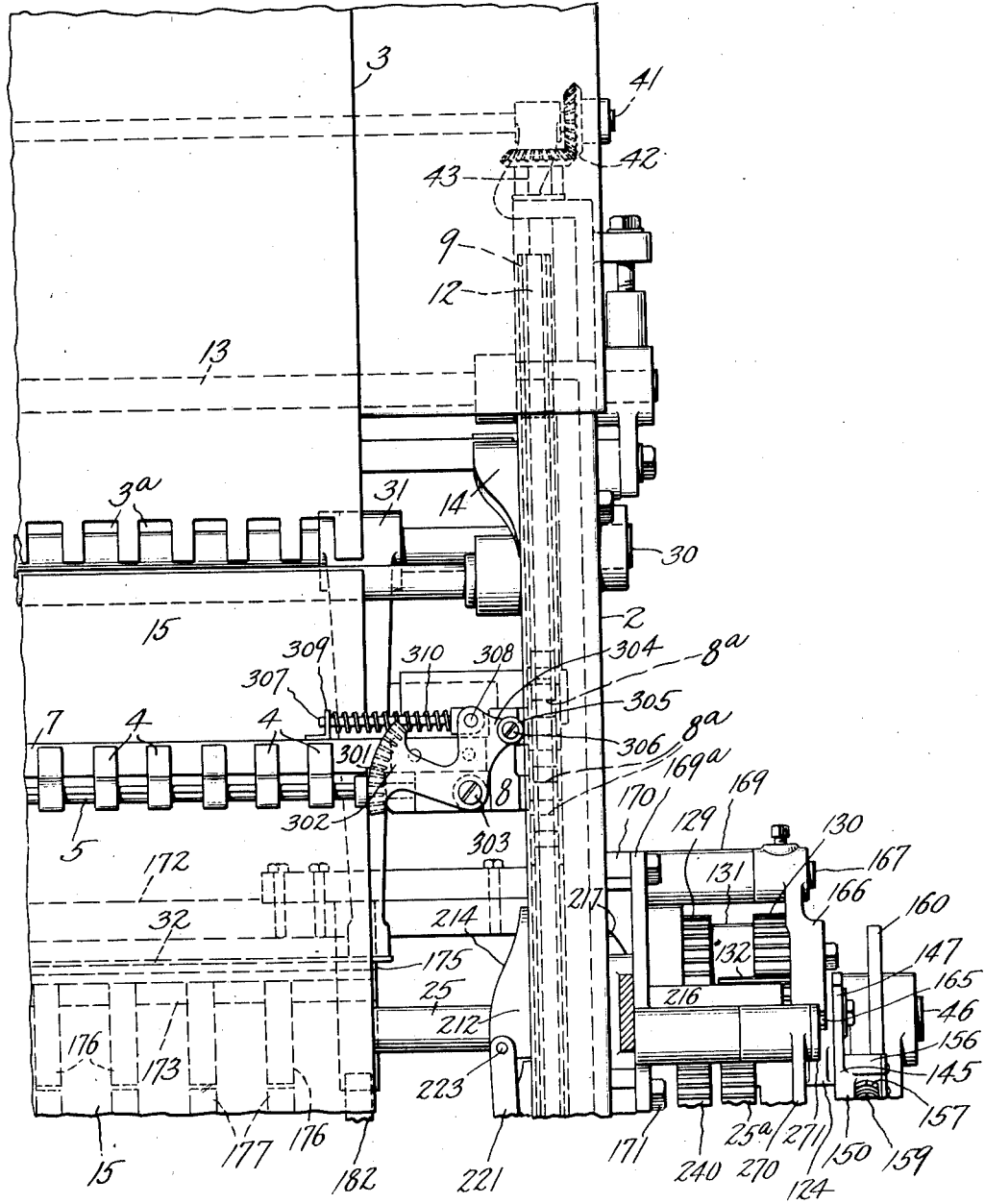

Patented June 12, 1928.

1,672,935

UNITED STATES PATENT OFFICE.

EDWIN W. GOODWIN, OF SOUTH BERWICK, MAINE, ASSIGNOR TO DEXTER FOLDER COMPANY, OF NEW YORK, N. Y., A CORPORATION OF NEW YORK.

FOLDING MACHINE.

Application filed August 29, 1925. Serial No. 53,315.

This invention relates to sheet-folding machines in which sheet-folding mechanism is cooperatively arranged and coordinated with respect to two sheet conveyors which operate one after the other upon a sheet for the purpose of folding said sheet during its transfer from one of said conveyors to the other or for transferring said sheet directly from one to the other of said conveyors without imparting a fold thereto.

The primary object of this invention is to provide an improved construction, combination, and arrangement of parts in a folding machine of this character whereby the relative dispositions of said conveyors and related parts can be changed at will by a simple unitary operation, for transferring sheets from one conveyor to the other with or without the folding operation.

One of the objects of the present invention is to provide mechanism of improved construction for coordinating the opening and closing movements of sheet-engaging grippers operating successively upon a sheet which is passed from one conveyor to another upon which said grippers are respectively mounted.

Another object of the present invention is to provide means of improved construction whereby changes in the relative disposition of cooperating grippers of different conveyors may be coordinated with the operations of other parts related thereto.

A specific object of invention is to provide means of improved construction for coordinating the variably timed operations of a folding machine of the character shown and described in U. S. Patent No. 1,547,348 granted to Earl D. Rader under date of July 28, 1925.

Other and further objects of invention will appear in the specification and be pointed out in the claims, a preferred embodiment being shown on the accompanying drawings, in which—

Figure 1 is a vertical longitudinal section of a sheet-feeding machine embodying the principles of my invention;

Figure 9 is a top plan view and horizontal section corresponding to the line 9—9, of Figure 4;

Figure 10 is a top plan view of one of the movable cams, etc.;

Figure 4:
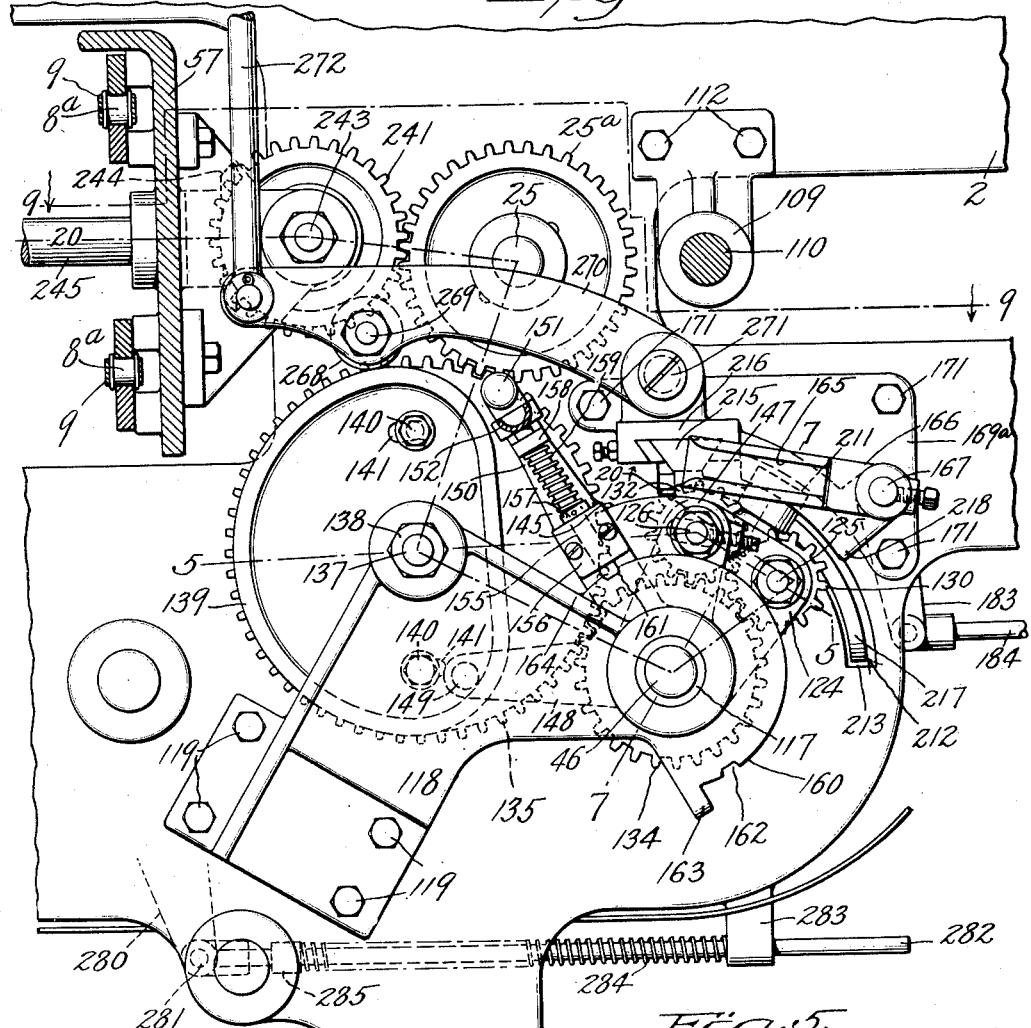
Figure 4 is a side elevation of mechanism for cutting-out one of the folding operations, portions being broken away and parts being shown in section.
Figure 5:
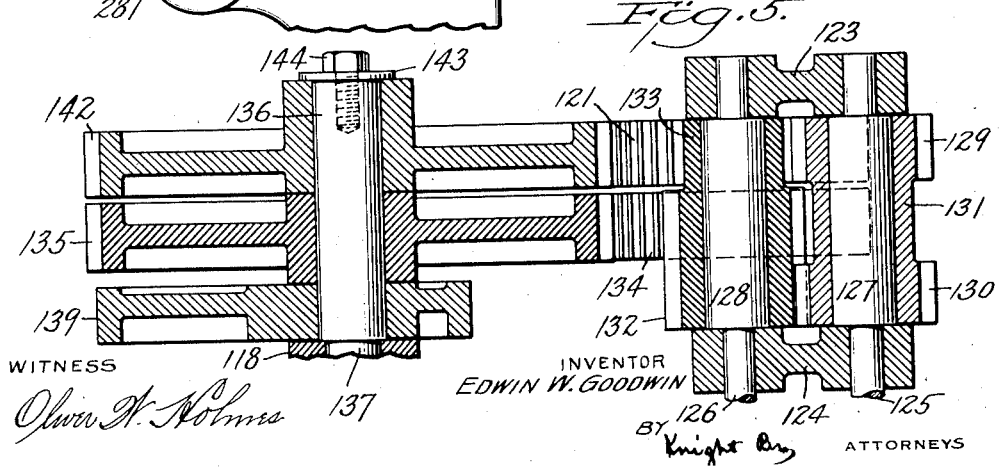
Figure 5 is a section on the line 5—5, Figure 4, parts being shown in plan.
Figure 13:
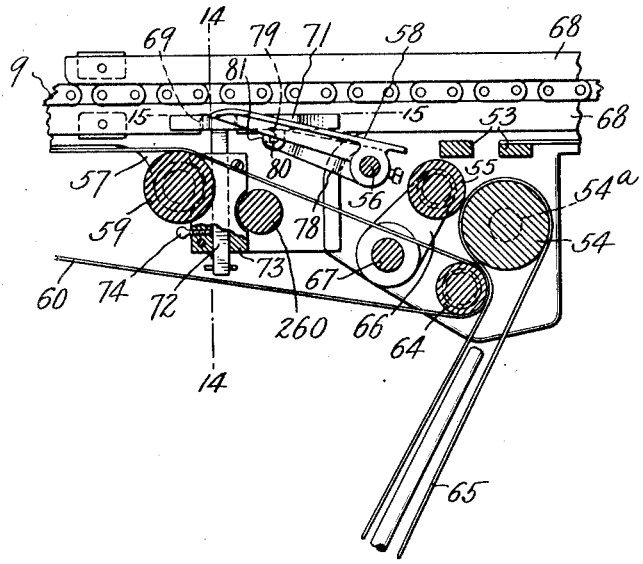
Figure 14:
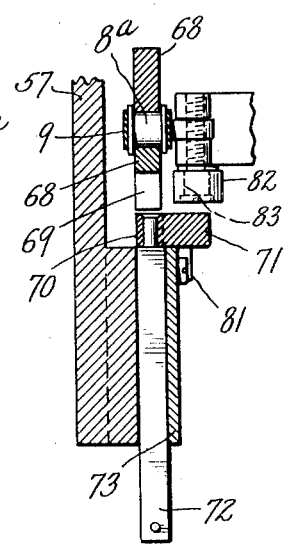
Figure 15:
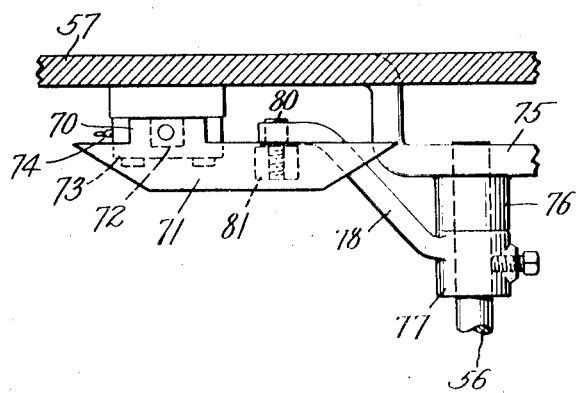
Figure 16:
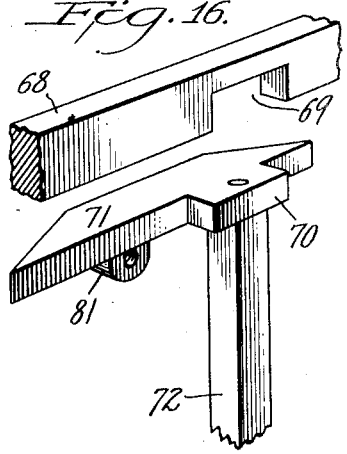
Figure 22:
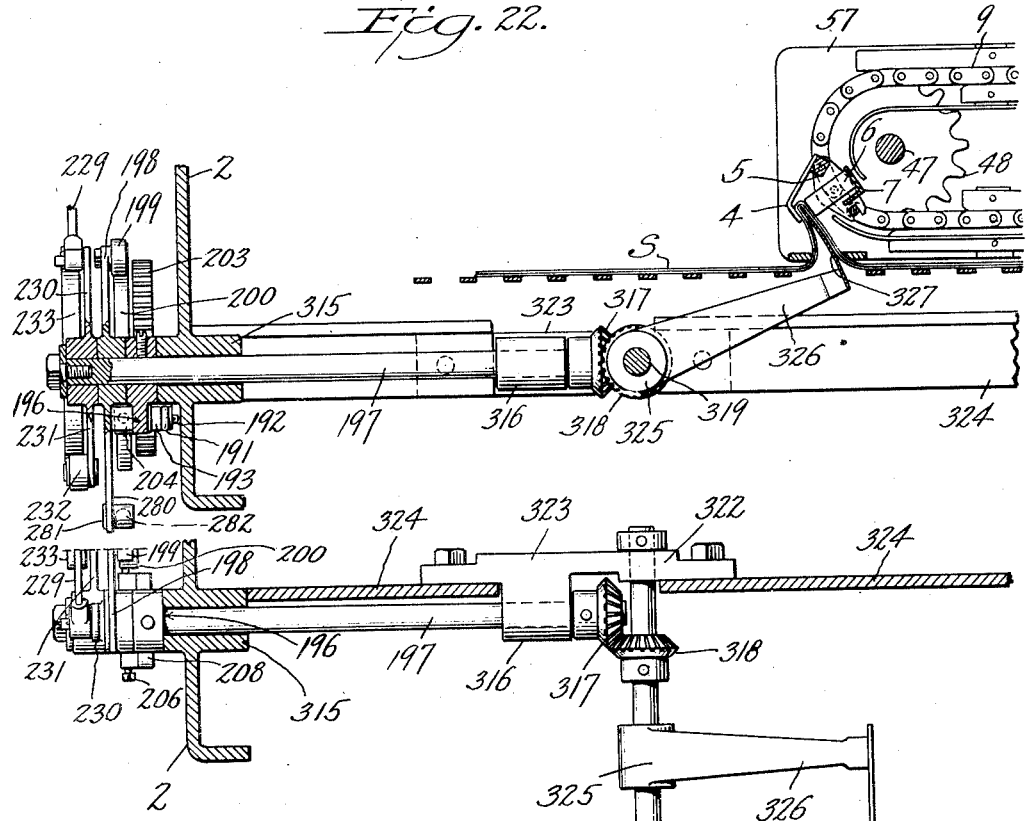
Figure 23:
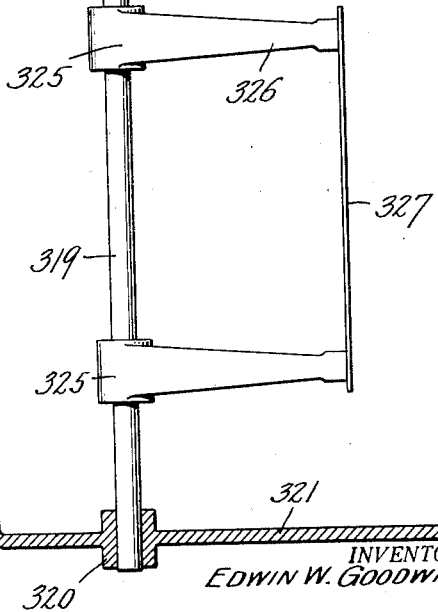

Figures 11 and 11$^a$ are complementary views showing a section on the line 11—11$^a$, Figure 1, portions being broken away, parts shown in plan, and parts omitted;

Figure 12 is a section on the line 12—12 of Figure 11$^a$;

Figure 13 is a fragmentary section similar to Figure 12, showing parts in changed positions;

Figure 14 is a section on the line 14—14, Figure 13, portions being broken away and parts shown in elevation;

Figure 15 is a section on the line 15—15, Figure 13, portions being broken away and parts shown in plan;

Figure 16 is a perspective view of one of the gripper cams, parts being broken away and parts shown in section;

Figure 17 is an enlarged side elevation taken from the left of Figure 11, portions in front of the plane of the drawing being shown in dot and dash lines;

Figure 17$^a$ is a section on the line 17$^a$—17$^a$, Figure 17, parts being shown in plan;

Figure 18 is a fragmentary side elevation corresponding to Figure 17 with parts shown in changed positions;

Figure 19 is a top plan view of Figure 18;

Figure 20 is a schematic section of the gear train corresponding to the broken line 20—20, Figure 4;

Figure 21 is a fragmentary top plan view of the folding machine;

Figure 22 is a combined side elevation and vertical section of the third folding mechanism, parts being broken away; and Figure 23 is a top plan view of Figure 22 with parts omitted and parts shown in section.

Referring more especially to Figures 1, 2, 3, 11, and 11ª of the drawings, a feed table 1 which extends transversely of the machine and rests upon the side frames 2, is provided with a feed-off plate 3 provided with a series of notches 3ª (shown best in Figure 21) which accommodate a transversely arranged series of gripper fingers 4 as they close down on the forward edge of a sheet presented over the feed-off plate 3. As shown in Figures 1 and 21, the gripper fingers 4 are carried by an oscillatory shaft 5 by means of which they are opened and closed with respect to fixed grippers 6 mounted on a transverse bar 7, said bar 7 being supported at opposite ends by laterally-spaced carriage frames 8. Journalled upon each of the carriage end-frames 8 and presented outwardly therefrom are two carriage-supporting rollers 8ª which travel between upper and lower longitudinal track-bars 300 which are inset from the inner faces of the oppositely arranged side frames 2 of the machine. Said carriage end-frames 8 are connected to and propelled by oppositely arranged endless chains 9 which travel over laterally-spaced sprocket wheels 10 keyed to a sprocket drive shaft 11 and other laterally-spaced sprocket wheels 12 keyed to a follower shaft 13. The carriages employed on each of the four conveyers embodied in the present embodiment of my invention are of substantially similar construction. Referring more especially to Figure 21, keyed to one end of each gripper-shaft 5 is a bevel gear 301 which meshes into and is oscillated by a bevel segment 302 which pivots on a stud 303 carried by the adjacent end-frame 8 of the carriages. A cam-arm 304 which is integrally formed with gear-segment 302, carries a cam-roller 305 journalled on a stud 306. A spring rod 307 which has one end pivotally connected to cam-arm 304 at 308, is slidably supported at its other end in a bracket 309. A spring 310 which is mounted on the rod 307 between the bracket 309 and pivot end of said rod tends to maintain the parts just described in the position shown in Figure 21, said position corresponding to the grippers in closed position. As each gripper-carriage of the first conveyer, passes upwardly around the sprockets 12, the cam-roller 305 travels over a cam 14, the upper end of said cam being shown in Figure 21. As said cam-roller leaves the cam 14, the previously opened grippers 4 are closed down on the forward edge of the sheet S, the continuing movement of the carriage operating to draw the sheet forward over a web or plate 15 which, as shown in Figure 1, extends from a line above shaft 13 and with its forward end overhanging the shaft 11. A similar supporting plate 16 is arranged below the lower run of the conveyor but is provided with a transverse slot 17. The first folding blade 18 is adapted to fold a sheet thru the slot 17 and between the folding bars 19, 19, said sheet being thus delivered to the closing grippers of the second conveyor. Said first folding blade 18 is carried by laterally spaced supporting arms 20, 20, which are keyed to a rock shaft 21.

Said second conveyor comprises a sprocket drive shaft 25, laterally spaced sprockets 26, 26, keyed thereto, a follower sprocket shaft 27, laterally spaced sprockets 28, 28, carried thereby, laterally spaced endless chains 29, 29, traveling over said sprockets, and gripper carriages similar in construction to those carried by the first conveyor, said gripper-carriages being provided with fixed sheet grippers 6 and movable sheet grippers 4. A rock shaft 30 has keyed thereto laterally spaced arms 31 which support at their outer ends the second folding blade 32. As a once-folded sheet comes into folding position below the second folding blade 32, the cam-roller 305 carried by the bell-crank lever 302, 304, which operates the second conveyor gripper, passes over an adjustable cam 330 which is movable along the under chain-guide bar 233ª of the lower run of the second conveyor (see Figures 1 and 19). Thereupon, the grippers are operated to release the sheet prior to the downward movement of said second folding blade.

As a sheet is drawn rearwardly across the folding bars 19, 19, its forward edge is released from the traveling grippers, the forward edge of said sheet being brought to rest against a front edge gauge 33 which is made adjustable by a screw rod 34 which may be rotated by a crank 35 operating thru a rotary shaft 36 and bevel gears 37. As the first folding blade 18 descends, the folded edge of the sheets is presented to the closing grippers of the second conveyor as said grippers move downwardly around the sprockets 26, 26. For this purpose, as shown in Figure 1, a cam track 331 extends along the inner side of the right hand side frame 2 and terminates at a point adjacent to the folding blade 18 in its lowered position. It will be understood, that where the cam roller 105 of each gripper mechanism carried by the second conveyor, strikes the cam track 331, the grippers are thrown into open position. When said cam roller leaves the forward end of said track bar 331, the grippers are permitted to close upon the folded edge of a sheet during its downward displacement by the first folding blade 18. The trailing portions of the folded sheet are confined by the curved guards or fingers 38 which depend from the folding bars 19, 19.

The once folded sheet is now ready to have a second fold imparted thereto or to be transferred directly to the grippers of a third conveyor as hereinafter more fully pointed out. Let it be assumed in the present instance, that a second fold, parallel to the first, is to be imparted to the once-folded sheet as it is delivered from the second conveyor grippers to the grippers of the third conveyor. For this purpose, as the grippers of the second conveyor are moved rearwardly along the lower run of its path, the folded edge of the sheet is intercepted by the stripping fingers 39, at about the time that cam-roller 105 comes into engagement with the movable cam 330, said cam 330 being preferably carried by one of the laterally-spaced end-blocks 39$^a$ between which extends a cross-bar 39$^b$ upon which the stripping fingers 39 are mounted (see more especially Figure 11). Said end blocks 39$^a$ are threaded on to the laterally-spaced screw rods 43 which may be turned by a crank 40 operating thru a cross shaft 41 and miter gears 42. It will be seen therefore, that as the once-folded sheet is stripped from the opening grippers, the folded edge is registered against said stripping fingers. Immediately thereafter, the folding blade drops to impart the second fold. For this operation, the shiftable cam 212 has been previously displaced to its inner position so that as the folding blade 32 falls, the grippers of the third conveyor are operated thereby to close upon the folded edge presented by said folding blade.

The third conveyor to which the once folded sheet may be delivered either with or without an additional fold, comprises a plurality of gripper mechanisms similar to those described above, laterally spaced sprocket chains 44, 44, laterally spaced driving sprockets 45, 45, keyed to sprocket drive shaft 46 and follower sprockets and sprocket shaft, (the last-mentioned parts not being shown on the drawings). The third conveyor, according to the present embodiment of my invention, presents the once or twice folded sheet in suitable position to be operated upon by the third folding blade which then delivers the once or twice folded sheet to a fourth conveyor while imparting thereto a second or third fold, as the case may be.

By referring to the lower left-hand portion of Figure 1, it will be seen that the grippers in the lower run of the third conveyer, are moving toward the left so that a once or twice folded sheet which has been gripped along its forward edge by said grippers and fixed gripping elements 6, is drawn along over the lower run of the third conveyer, and around the follower sprockets with said folded sheet trailing behind them. The once or twice folded sheet, thus propelled, is conveyed to a position to be operated upon by the third folding blade 327 shown in Figures 22 and 23. As the folded sheet is released by the third conveyer grippers and comes to rest below the left end of the fourth conveyer according to Figure 22, the third folding blade 327 moves upwardly to impart a fold transverse to the first and second folds and in so doing, presents the folded edge thereof to the closing grippers of the fourth conveyer.

The fourth conveyor which is shown in Figures 11, 11$^a$, 12, and 22, comprises a sprocket drive shaft 47, laterally spaced drive sprockets 48, 48, keyed thereto. laterally spaced follower sprockets 49, 49, and gripper mechanisms similar to those described above. Referring now to Figures 22 and 23, a rock-shaft 197 (provided with suitable power connections to be hereinafter described), is journalled in axially-spaced bearings 315 and 316. Keyed to the inner end of rock-shaft 197, is a miter pinion 317 which meshes with a miter gear 318 keyed to the third folding blade rock-shaft 319. Said rock-shaft 319 is journalled at its outer end in a bearing 320 carried by the transverse frame 321 and at its inner end in a bearing 322. Said bearings 316 and 322 are carried by a bar or strap 323 which is bolted to the spaced ends of transverse rails 324. Keyed to the oscillatory shaft 319 are the axially spaced hubs 325 of two folding-blade supporting arms 326, the third folding blade 327 being secured to the outer ends of said arms and thereby adapted to impart an additional fold to a once or twice folded sheet while at the same time inserting the folded edge thereof between the grippers 4 and gripping posts 6 which are mounted on the fourth conveyer as shown in Figure 22. As shown in Figure 12, a fourth fold rock shaft 50 to which is keyed laterally spaced lever arms 51, 51, is adapted to raise and lower the fourth folding blade 52 which is mounted on the outer ends of said lever arms. As indicated in Figures 12 and 13, the previously folded sheet may again be folded by the folding blade 52 between the folding bars 53, 53, into the bite of folding rolls 54 and 55 or said folded sheet may be discharged to the packing box without being folded at this point.

In order that a previously folded sheet may be discharged from the machine at this point without further folding, a transverse rock shaft 56 which is oscillatably mounted in the side frames 57, 57, carries a plurality of laterally spaced bridge guides 58 provided with downwardly deflected outer ends disposed adjacent to the cylindrical outer surface of a tape roller 59 over which passes endless sheet conveying tapes 60. Adjustably mounted on a transverse bar 61 at the rear end of the machine are a plurality of tape roller brackets 62 in which are journalled tape rollers 63. Cooperating with these tape rollers and tape roller 59 for supporting the tapes 60, is a delivery tape roller 64. Cooperating with the endless tapes 60 as they pass over the roller 64, are other endless tapes 65 which pass around the roller 54 above and are inclined downwardly and rearwardly toward the packing box mechanism (not shown). It will be seen in Figure 12 that pressure roller 55 is journalled in the outer ends of suitable arms 66 which are mounted upon a cross shaft 67.

The lower chain guide bar 68 is provided with a rectangular notch 69 which as shown in Figure 16, is adapted to receive a rectangular projection 70 on the outer edge of a gripper-operating cam 71. Depending from the cam 71 is a guide bar 72, said guide bar being reciprocably mounted in a box-like guide 73 which is supported from the adjacent side frame of the machine. A thumb screw 74 which is threaded into said guide, may be utilized for retaining the gripper cam 71 in elevated position when desired. As shown in Figure 15, one end of the rock shaft 56 is carried by a bracket arm 75 which projects inwardly from the adjacent frame. Separated from this bracket arm by a collar 76, is the hub 77 of a lever arm 78 which is provided with a slot 79 in its outer end. Movable in the slot 79, is a stud 80, said stud being threaded into a boss or protuberance 81 which projects from the under side of cam 71. It will be understood from this description that whenever the rock shaft 56 is oscillated on its axis, the gripper operating cam 71 is raised or lowered along with the bridge guides 58. Thus when said bridge guides are in raised position as shown in Figure 13 for cutting out the folded sheet before reaching the fourth fold, the cam 71 is raised into position to engage the cam roller 82 (see Figure 14), said cam roller being journalled upon a stud 83 carried by an arm which when thrown by the cam action serves to open the grippers and release the sheet.

Main power drive.

Referring now to Figure 1, a motor 100 carries an armature shaft 101 to which is keyed a small pulley 102. An endless belt 103 which is driven by the pulley 102, runs over a larger pulley 104 keyed to a drive 110. Suitable axially spaced bearings 109, 109, for said drive shaft are mounted on the opposite side frames 2, 2, one of said bearings being arranged in a depending bracket shown in Figure 4 and the other of said bearings being provided in a plate 111 shown in Figure 17. Said bracket and plate are secured to said side frames by bolts 112. Keyed to the drive shaft 110, is a drive pinion 113 which meshes with a large spur gear 114, (shown in construction lines in Figure 17).

A shaft 46 to which the gear 114 is keyed constitutes the sprocket drive-shaft of the third conveyor.

Retiming mechanism.

The folding machine shown on the drawings contemplates a sequence of operations whereby four successive folds may be imparted to laundry work, for example, or to other materials adapted to be operated upon in a similar manner. It further contemplates the omission of one or more folds, the embodiment shown and described herein, being adapted to omit the second or fourth folds, means for cutting out the work before imparting the fourth fold, having been hereinbefore described. For convenience in description, the following discussion is confined to a folding machine in which it may be desired to omit the second folding operation and relates more especially to the provision of suitable means for readjusting the relations of conveyors and other parts related thereto whenever the second fold is to be omitted from or reincluded in the sequence of operations.

The retiming mechanism includes, in the present instance, an assemblage of mechanisms so linked together under unitary control as to be operated simultaneously for effecting a redisposition of certain parts of the machine necessary to effect the omission of one of the folds, in the present instance, the second fold. The procedure involves five operations as follows—

1. A retiming of the sprockets carrying the second conveyor system with respect to those carrying the third conveyor system, for the reason that when omitting the second fold by transferring the work directly from the second to the third conveyor gripper, the cooperating grippers of both conveyors must be made to arrive at the transfer point at the same time. Otherwise, when the second fold is being included in the sequence of operations, the second conveyor gripper passes the transfer point considerably in advance of the gripper of the third conveyor system. This retiming thus becomes a readjustment in the time relationship between two sections of the machine, the first section, according to the present embodiment of my invention, comprising the first and second conveyor system with their rotating cams, and the second section comprising the third and fourth conveyor systems, the packer box mechanism and their rotating cams as hereinafter explained. This retiming amounts to 180° of cam speed.

2. When the second fold is omitted, the actuated sheet supports 176, must be moved to the position shown in Figure 3 to open up a gap at the transfer point so as to permit the passage of the work from the second to the third gripper without being folded.

3. The stationary cam which holds the third gripper open until it reaches the knife and then causes it to close, must be retracted to an inoperative position and another cam made operative which will close the third gripper upon the work at the point of transfer.

4. A cam must be brought into an operative position for opening the second gripper at the point of transfer.

5. The knife which would otherwise make the second fold, must be prevented from descending.

Figures 1, 2, 4, 9, and 11, show relative dispositions of the parts during the inclusion of the second fold mechanism. In order to provide suitable means for changing the relative dispositions of parts for operating the folding machine without including the second fold, I preferably employ what may be termed a "planetary mechanism" and certain related parts now to be described whereby the second conveyor may be adapted to transfer the once-folded sheet directly to the third conveyor.

Referring to Figures 4, 5, 6, 9, and more especially to the diagrammatic showing in Figure 20, the sprocket drive shaft 46 is preferably journaled in axially spaced bushings 116 and 117, carried respectively by side frame 2 and bracket 118 which helps to support a planetary movement to be presently described. Said bracket is secured to the side frame by bolts 119 as shown in Figure 4. The bushings 116 and 117 are provided with enlarged inner ends 116ª and 117ª between which is arranged the elongated hub 120 of a driving spur pinion 121. This pinion is keyed to shaft 46 by a key 122. Mounted to swing upon the end-enlargements 116ª and 117ª of bushings 116 and 117, are oppositely arranged triangular bracket arms 123 and 124, said brackets being shown best in Figures 4, 5, 6, 7, and 20. Rigidly uniting the outwardly enlarged ends of said triangular brackets, are studs 125 and 126 which are thus arranged parallel to and equally-distant from the shaft 46. Intermediately of the brackets, said studs are provided with enlarged journalling portions 127 and 128 for rotatably supporting the planetary gears presently to be referred to. By an inspection of Figure 20 which represents a plan development of the gear trains on the lines 20—20 of Figure 4, it will now be seen that power supplied by shaft 46 is transmitted thru gear pinion 121 to the spur gear portion 129 of a double gear, the other spur gear portion 130, thereof being integrally connected thereto by an elongated hub 131 which is common to both of said gear portions. Said double gear is journaled upon the journaling bearing 127 of stud 125. Meshing with the gear portion 130 is a broad-faced gear 132 provided with an elongated hub 133 which is freely journaled on journal bearing 128. An idler spur gear 134 which is freely journaled upon the hub 120 of gear 121, meshes with and is driven by the spur gear 132, said gear 134 being also in mesh with a larger spur gear 135 which is freely journaled upon the enlarged portion 136 of a stud of which the reduced end 137 is mounted in bracket 118 and secured in position therein by a nut 138. Mounted on the portion 136 of said stud and arranged between the bracket 118 and gear 135 is a cam disk 139 which is adjustably connected to the gear 135 by bolts 140 which for this purpose extend thru arcuate slots 141 in the cam disk and are threaded into the web of gear 135. According to this embodiment of my invention, the cam disk 139 is arranged and timed to operate the first folding blade. Power is delivered to the second conveyor sprocket drive shaft 25 by means of a spur gear 25ª keyed thereto and meshing with the spur gear 135. As shown in Figure 20, the spur pinion 121 meshes with an idler 142 which is freely journaled on the journaling portion 136 of stud 137, said idler being confined between the cam driving gear 135 and a washer 143 which is secured in position by a bolt 144. It will be understood from the foregoing description that the spur gears 135 and 142 are rotated at the same speed but in different directions under power derived from the sprocket drive shaft 46. In the present embodiment of my invention, each of these gears rotates once for each operation of the machine. One of these gears, namely, the gear 135 which carries the cam for operating the first fold blade, is connected up to drive the first section of the machine. The other of said gears, namely, the gear 142 is connected up to drive the second section of the machine. In order to make the retiming of the sprockets more clearly understood, the following description of the procedure in connection with the particular embodiment of my invention shown on the drawings, may be noted.

Figure 2:
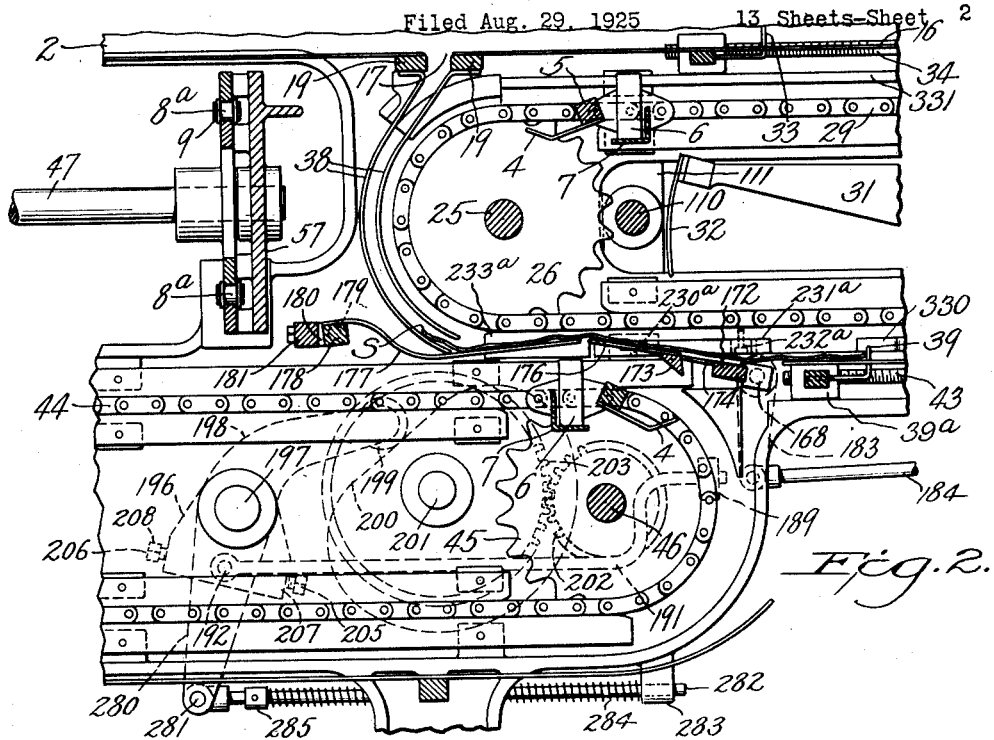
Figure 2 is a vertical longitudinal section of a fragmentary portion of the same on an enlarged scale.
Figure 3:
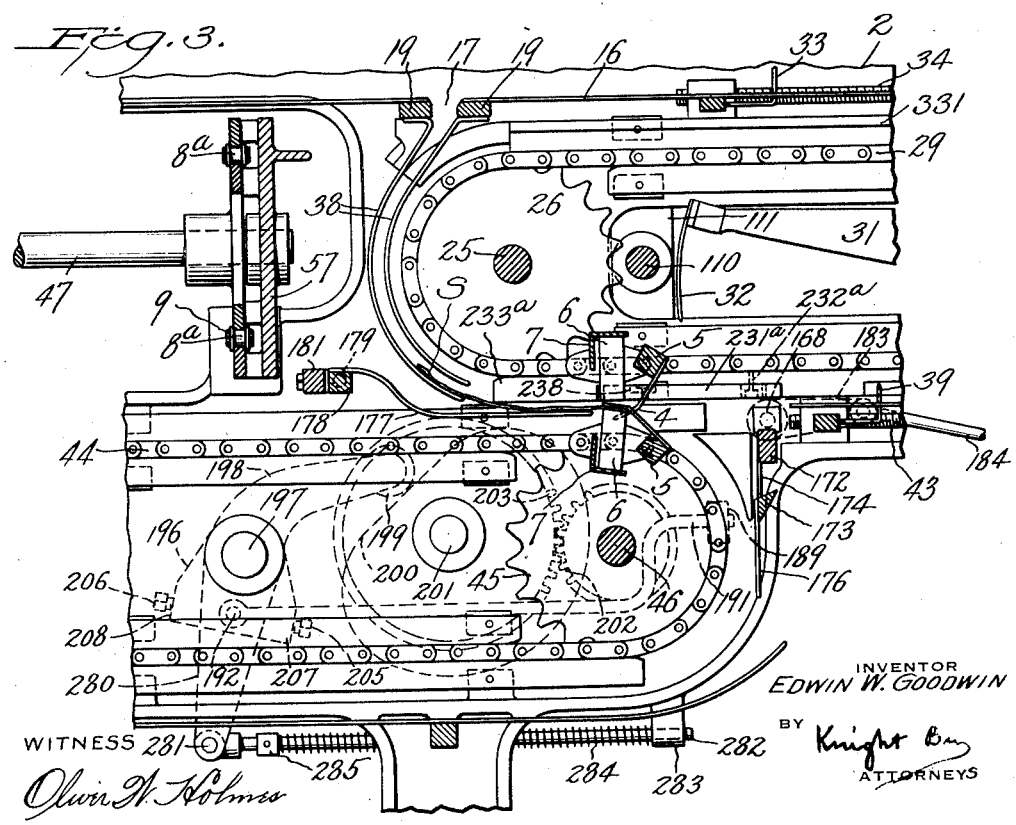
Figure 3 is a section similar to Figure 2 showing some of the parts in changed positions.

It will be understood that the amount of shift imparted to one section of the machine with respect to the other section of said machine, is purely empirical. According to the present embodiment of my invention, I have made use of three sets of grippers in the first conveyor, each set being spaced from each other set by 34 links in the chains. In the second conveyor, are two sets of grippers spaced 32 links apart. In the third conveyor, are two sets of grippers spaced 40 links apart. In the fourth conveyor, are three sets of grippers spaced 36 links apart. When the machine sections are relatively arranged to include the second fold in the sequence of operations as shown in Figure 2, each set of grippers in the second conveyor is timed to release the widest sheet to which the second fold may be imparted, in time to be operated upon by the second folding blade. In order to eliminate the second fold by having the cooperating grippers of the second and third conveyors reach the transfer point at the same time, the several parts of the second and third conveyors have been so related and connected that this may be brought about by shifting the grippers one-half the interval between adjacent sets of the second conveyor. For this purpose, the planetary gears 129, 130, and 132 have been provided with one-half the number of teeth that are contained in gears 121 and 124. As pointed out above, said gears 121 and 124 contain one-half as many teeth as gears 142 and 135 do. With the construction and arrangement of parts above described, the necessary relative shift between the grippers of the second and third conveyors for bringing said grippers into step at the transfer point, may be had by revolving the planetary frames 123 and 124 thru an angle of 180 degrees. Thus, the spur gears 135 and 142 belong to gear trains respectively which drive the first and second sections of the machine. Each of these gears is in mesh with a gear 134 or 121 of one-half its size on the sprocket drive shaft 46 of the third conveyor. Said shaft 46 turns twice for each operation of the machine. When the planetary frames are held stationary, the loose gear 134 will receive thru the planetary gears, an equal and opposite rotation to the gear 121 which is keyed to the shaft 46, these equal and opposite rotations being maintained thruout the two gear trains permitting the operation of the entire machine. If, however, the planetary gears are moved about the axis of the shaft 46 thru an angle of 180 degrees, the sprocket shaft gears 134 and 121 will have imparted thereto a relative rotation of one complete turn while the large gears 135 and 124 will receive a relative rotation of one-half a turn. The effect of this movement is to place the grippers of the second and third conveyors into step at the transfer point.

Figure 6:
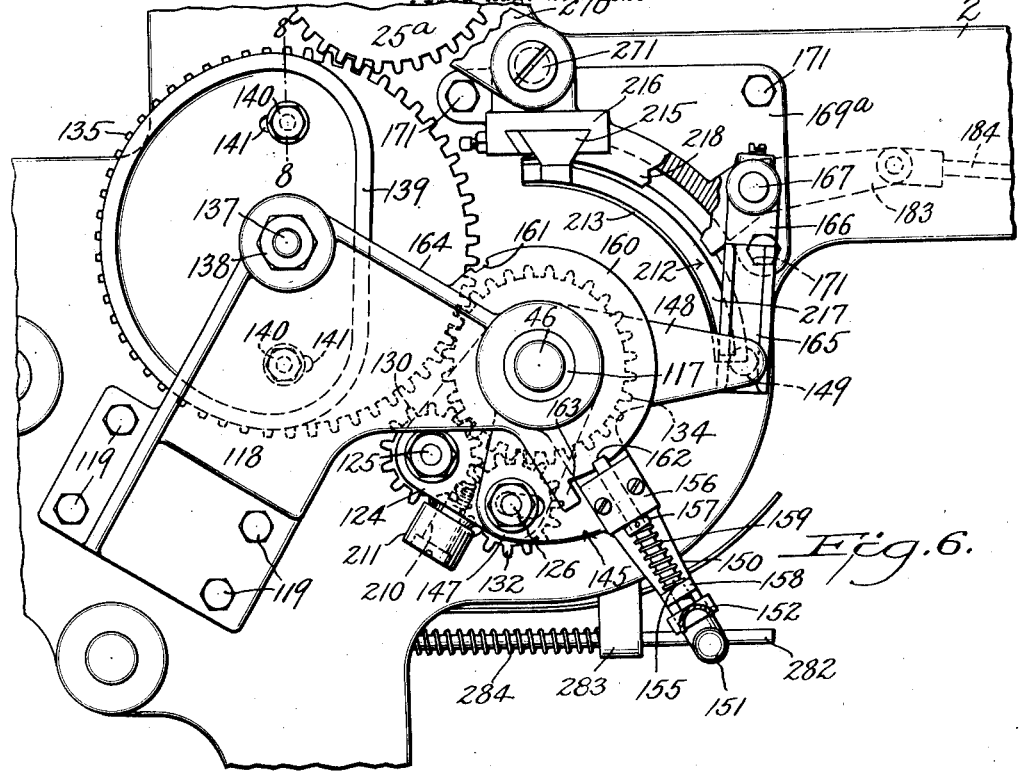
Figure 6 is a side elevation similar to Figure 4, portions being broken away and parts omitted.

Suitable mechanism for effecting the above described changes in the operations performed by this machine, may comprise a shift-lever supporting plate 145 having a hub portion 146 carried by the bushing 117, said plate being arranged between the supporting bracket 118 and the outer planetary bracket 124. An integrally formed arm 147 of said plate is secured in fixed relation to the planetary bracket 124 by means of the stud 125. A cam lever operating arm 148 which is also integral with plate 145, carries a cam roller 149 adapted to actuate the slotted lever-arm 166 for actuating the sheet supports at the transfer point between the second and third conveyors. Another ra- dial arm 150 (see Figure 9) carried by the plate 145 is provided with a laterally projecting handle 151 and adjacent thereto a latch grip 152 which is pivotally mounted at 153 on a lug 154 which projects inwardly from the arm 150. A radially reciprocable bolt 155 which slides in a guide block 156, is connected at its outer end to said latch grip, said bolt being provided with a collar 157 between which and an outwardly projecting lug 158 on the radial arm 150, is mounted a compression spring 159. As shown in Figures 4, 6, and 9, the angular supporting bracket 118 has an approximately semi-circular flange 160 which is integrally formed thereon, said flange being provided with notches 161 and 162 arranged 180 degrees apart on the periphery of said flange. The swinging movement of the planetary lever arm 150 may be limited at one end by a stop or lug 163 and at the other end thereof by a flange 164 which extends along the arm of the elbow bracket 118. It will be understood from the above description that by swinging the handle 151 for 180 degrees about the shaft 46 at rest, a complete turn is imparted to gears 129, 130, and 132. The effect of this movement is to produce one complete turn of gear 134, made up of one-half turn due to the rotation of gear 132 and the other one-half turn due to 180 degrees of swing of the gear 132 about the axis of shaft 46. One turn of gear 134 imparts one-half a turn to gear 135 (equivalent to 180 degrees of cam speed), this movement in turn imparting eight-tenths of a turn to gear 25ª. The shaft 25 being thus turned eight-tenths of a complete revolution, produces a movement in the driving sprocket 26 of the second conveyor, equal to eight-tenths times 20 (number of teeth in said sprocket) or a movement of 16 teeth of said sprocket. This movement of the sprocket 26 corresponds to a movement of the second conveyor equivalent to 16 links of said second conveyor or one-half the distance between the groups of grippers carried thereby.

*Mechanism for actuating the sheet supports and for shifting them at the transfer point.*

Referring now to Figures 4, 6, 9, 11 and 17, a suitable folding bar unit adapted to be shifted from a normal position in cooperative relation to the second folding blade to a position in which a suitable gap is opened for transferring the sheet from the second conveyor to the third conveyor without folding, may be provided as follows. Coaxially arranged trunnions 167 and 168 are oscillatably mounted in the opposite side frames 2, 2, said trunnions being provided with squared inner ends within the side frames 2, 2. A folding bar 172 has its opposite ends bolted to the squared inner ends of the trunnions 167 and 168, a companion folding bar 173 being rigidly connected thereto and supported thereby by means of suitable bars or supports 174 and 175 (see Figure 11). Projecting from the folding bar 173 are laterally spaced sheet supporting fingers 176 the extremities of these fingers normally resting in juxtaposition to the projecting ends of similarly spaced supporting fingers 177 carried by a square shaft 178 which has its opposite ends 179, 179, oscillatably mounted in blocks 180, 180, carried by a stationary rod 181 which extends between the side frames 2, 2, of the machine. As shown in Figure 11, the right hand support 175 is extended to normally position its outer end beneath and in supporting engagement with an oppositely presented arm 182 carried by trunnion 178.

Referring to Figures 11 and 17, the left-hand trunnion 168 of the oscillatable folding bars, carries on its outer end a depending lever arm 183. Pivotally connected to the free end of this lever arm is one end of a spring rod 184 upon which is fastened a collar 185, a compression spring 186 being interposed between said collar and a rod support 187 which slidably supports the other end of said spring rod. A check nut 90 threaded to the right end of said rod (see dotted lines in Figure 1) serves to limit the endwise displacement of said rod. The position of lever arm 183 as shown in Figure 17 corresponds to the position of the planetary shift lever shown in Figure 4. According to Figure 17, the spring 186 tends to retain lever arm 183 against a fixed stop 188 which is adjustably threaded into a block 189 which is secured to the side frame 2, by bolts 190. At such times as the lever arm is against said stop, the sheet-supporting fingers will be in raised position to permit the third conveyor grippers to pass below said fingers. On the other hand, at times when the second conveyor grippers are passing said fingers, the lever arm 183 is momentarily displaced toward the left according to Figure 17, to depress said fingers. For this purpose, a bent cam operated rod 191 has one end slidably mounted in the block 189, the other end of said cam rod being pivotally connected to a stud 192 (see Figure 17ª), said stud being threaded into the square head 193 of a bolt 194. The bolt 194 is adjustable within a slot 195 in a downwardly enlarged lever arm 196 which is adjustably connected to a cam lever 198 provided with a cam roller 199 running over a cam 200. Cam 200 is journalled on a stud 201 and driven by a pinion 202 keyed to the third conveyor sprocket drive shaft 46 and meshing with a gear 203 which rotates with the cam 200. Said bolt 194 is threaded into a projection 204 which is integrally formed on the lower arm 280 of cam lever 198 and arranged between opposed set screws 205 and 206 which are threaded into projections 207, 208, on slotted lever 196.

A rocker shaft 197 which, according to the present embodiment of my invention, indirectly operates the third fold blade, is journaled in the adjacent side frame. Cam 200 is primarily employed for operating said third fold blade thru a cam lever 198. Slotted lever 196 is pinned to rocker shaft 197 thus permitting an adjustment of the third fold blade by means of set screws 205 and 206, after which said slotted lever may be clamped to the cam lever by means of screw 193. Said lower arm 280 of the cam lever is connected at 281 with a spring rod 282 which reciprocates in a guide 283 under the action of a compression spring 284 arranged between said guide and a collar 285. It will be understood from this description that the movements of cam lever 198—280 transmitted thru bent rod 191 and lever arm 183, rocks the oscillatable folding bar unit at the second fold and thus momentarily raises and lowers the sheet-supporting fingers 176 and 177 while the grippers of the second and third conveyors are passing the transfer point under normal conditions under which the second fold is being included in the sequence of operations.

As shown in Figures 9, 10 and 11, the trunnion 167 is mounted in an elongated bearing 169 which projects laterally from the base plate 169ª of a dovetail slide supporting bracket, said base plate being spaced from the side frame 2 by suitable bushings 170 but secured to said side frame by bolts 171. Secured to the outer end of trunnion 167 (see more especially Figures 4, 6, and 9) is an arm 166 provided with a cam slot 165 which is normally presented in the planetary path of cam roller 149 carried by lever arm 148. As the radial arm 150 is moved in a clockwise direction according to Figure 4, cam roller 149 enters cam slot 165 and thus imparts a counter-clockwise movement to lever arm 166 which assumes the position shown in Figure 6. This operation throws the folder bars 172 and 173 with supporting fingers 176 into sheet transferring position shown in Figure 3, a gap being opened in the sheet-supporting means of the second conveyor.

*Mechanism for operating third conveyor grippers at second fold and transfer point.*

Figure 7:
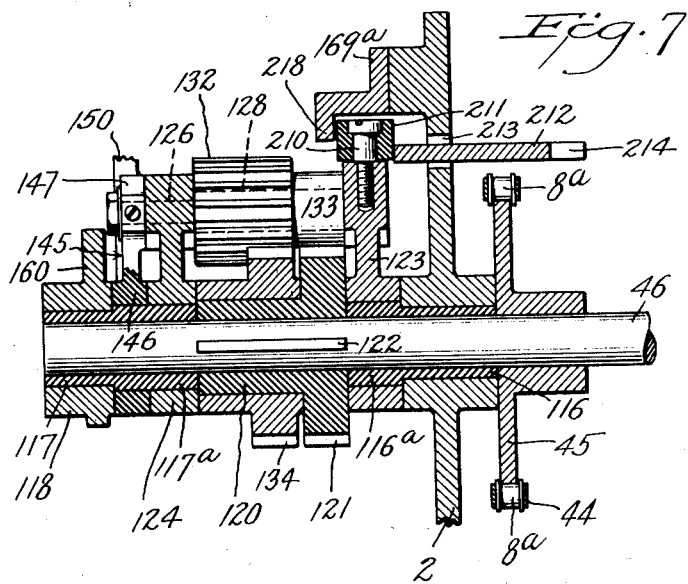
Figure 7 is a section on the line 7—7, Figure 4.
Figure 8:
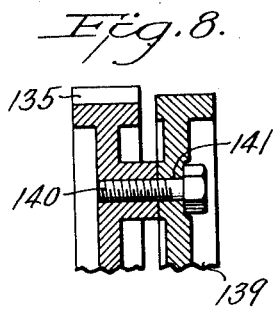
Figure 8 is a section on the line 8—8, Figure 6.

As shown best in Figures 6 and 7, the planetary frame carries a stud 210 with a cam roller 211 for operating the third conveyor gripper controlling cam 212. In the position shown in Figures 4 and 10, said cam roller positions cam 212 to hold the third conveyor grippers open until the second fold is presented thereto by the second folding blade. As shown in Figures 7, 9, and 10, said cam is part cylindrical with respect to the axis of sprocket shaft 46. An arcuate slot 213 in the side frame 2 accommodates cam 212, said cam having an inner spiral face similar to that of the corresponding cam at the first fold. Suitable means for supporting and constraining the shifting movement of this cam, may be provided by a dovetail slide 215 from which it depends, said slide being reciprocably mounted in a dovetail bracket 216 which is suitably grooved for this purpose. The outer cam face 217 of the cam 212 is cut on a spiral opposite to that of the inner cam face 214. A depending ledge or flange 218 on the dovetail bracket 216 serves to reenforce the cam roller 211 in its support of the cam 212 during the second fold operation (see Figure 10). From an inspection of Figure 10, it will be seen that said cam is provided with a flat surface 212$^a$ between which and the depending flange 218, the cam roller 211 may lodge more securely. Secured to the chain guide bar 219 at some distance from cam 212 is a transfer gripper operating cam 220 which is provided with a suitably formed extension 220$^a$ for holding the third conveyor grippers open until the transfer point is reached. A link or bridge-bar 221 has one end pivotally connected at 222 to said cam 220, the other end thereof being pivotally connected at 223 to the cylindrical cam 212. When set for omitting the second fold, the planetary movement is thrown to the position shown in Figure 6, thus carrying the cam roller 211 out of its supporting position with respect to cam 212, which is returned to inoperative position by the first second conveyor gripper that passes thereover. At the same time, the movable end of bridge bar or link 221 is retracted to uncover the fixed cam therebeneath which may then operate to close the third conveyor gripper at the transfer point. It will be seen in Figure 10 that the outer spiral cam surface 217 of cam 212 when in dotted line position, is adapted to be engaged by cam roller 211 during the reverse movement of the planetary gears and thus returned to operative position shown in full lines.

*Mechanism for preventing the operation of the second fold blade.*

Referring to Figures 17 and 18, a lever arm 225 which is mounted upon the outer end of trunnion 168, may be thrown into position to block the downward movement of the outer end 226 of a curved arm 227, said curved arm being secured to the rock shaft 30 which carries the second folding blade. This movement of the lever arm 225, is produced whenever the planetary mechanism is revolved to its lower position shown in Figure 6. Keyed to the outer end of the second fold rock shaft 30 is an operating lever arm 228 connected by a rod 229 to one arm 230 of a cam lever which oscillates upon the stud 197. The other arm 231 of this cam lever carries a roller 232 which runs on a second fold operating cam 233 which rotates with cam 200 on the stud 201.

*Mechanism for operating the second conveyor grippers at the transfer point.*

Referring again to Figures 17, 18 and 19, it will be seen that a link 234 has one end pivotally connected at 235 to lever arm 225, the other end of said link being pivotally connected to a pin 234$^a$ which is carried by the bifurcated arms 236$^a$ of a slotted block 236. A pin or stud 237 carried by said slotted block serves as a pivotal operating connection for the connected ends of toggle links 238, 238, one of said links having its other end pivoted on a fixed stud 239. The other of said toggle links is pivotally connected at 230$^a$ to a cam 231$^a$ for operating the grippers of the second conveyor at the transfer point. As shown, this operating cam is pivotally mounted on a fixed stud 232$^a$, carried by one of the chain guide bars 233$^a$ for the second conveyor.

*Fourth conveyor drive.*

Referring now to Figures 11, 11$^a$, 12 and 20, an idler gear 240 which is freely journaled on the second conveyor sprocket drive shaft 25, receives power from the idler 142 and drives a gear 241 keyed to the hub of a bevel 242 which is freely journaled on a stub shaft 243. A second bevel gear 244 which meshes with bevel gear 242, is keyed to a cross shaft 245 which is journaled in parallel transverse side frames 57, 57. Keyed to shaft 245 is a miter gear 248 which meshes with and drives a second miter gear 249 which is carried by a shaft 250. The shaft 250 is journaled in bearing brackets 251, 251, and extends parallel to the transverse frame 57. A miter gear 252 which is also keyed to shaft 250, meshes with another miter gear 253, the last mentioned miter being keyed to the driving sprocket shaft 47 of the fourth conveyor hereinbefore described.

As shown in Figure 11$^a$, shaft 245 extends thru and projects beyond frame 57, the projecting portion of said shaft having keyed thereto a spur pinion 254. As shown in dotted lines in Figure 12, the spur pinion 254 drives an idler 255 which meshes with a smaller spur gear 256, the last mentioned gear being non-rotatably secured to the shaft-end portion 54$^a$ of the roller 54 which is thus adapted to drive the conveyor tapes 65 by which the discharging sheets are delivered to the packing box. An idler gear 257 which is journaled upon a stationary stub shaft 258, transmits power from idler 255 to a large spur gear 259, the last mentioned gear being keyed to a cam shaft 260 journaled in frames 57, 57, and having one end thereof projecting beyond the adjacent frame. Adjacent to the gear 259 on the projecting portion of cam shaft 260, is keyed a cam 261 for operating the fourth fold folding blade.

The sprocket drive shaft 11 of the first conveyor may receive power from the sprocket drive shaft 25 of the second conveyor by means of a gear train including a spur gear 262 keyed to the far end of shaft 25 according to Figure 1, idlers 263, 264, 265, and a driven spur gear 266 which is keyed to the sprocket drive shaft 11 of the first conveyor.

As shown in Figure 4, cam 139 drives a cam roller 268 journaled on a stud 269 carried by a cam arm 270, said cam arm being pivoted upon a stud 271. The outer end of said cam arm is connected by a rod 272 to a lever arm (not shown) which is carried by the rock shaft 21 which carries the first folding blade.

*Operation.*

In recapitulation let us assume that the machine is set for making the fold. We shall observe that the shift handle points upward and to the left. The grippers of the second conveyor pass the transfer point in advance of the grippers belonging to the third conveyor. The planetary cam roll holds the dovetail cam in its operative position for closing the third gripper at the second knife which is free to descend. The cam controlled by the toggle joint is retracted to its inoperative position, and the pin in the shift lever being out of engagement with the slotted lever belonging to the sheet supporting mechanism, the sheet supporting fingers are horizontal and are free to perform their "breathing action."

If now the shift lever be unlatched and moved to the lower or transfer position, the conveyor mechanism of the second half of the machine stays at rest while that of the first half is moved by the planetary gears to a new position. The planetary cam roll moves out of engagement with the dovetail cam which is now free to be pushed back to its inoperative position thus uncovering the closing cam at the transfer point. The pin in the shift lever casting engages the slotted lever and tilts down the sheet supports, opening a gap at the transfer point. On the rear of the machine the toggle joint straightens out, putting into position the transfer opening cam, and at the same time presenting the end of the crank lever to the lever on the knife rocker shaft for holding up the knife.

In shifting the mechanism back to its original position, these five operations are performed in reverse order, the several parts being thus restored to their original positions.

The operation of the fourth conveyor cut out has been described in an earlier portion of this specification.

I claim:—

1. In a machine of the character described, the combination with a power-driven drive shaft for driving one section of the machine, of a second drive shaft for driving another section of said machine, driving connections between said drive shafts including planetary gears movable about the axis of one of said drive shafts, and means for supporting and moving said planetary gears about the axis of their planetary movement whereby the timed relations between said first and second drive shafts may be adjusted.

2. In a machine of the character described, the combination with a conveyor power-driven drive shaft, of a second conveyor drive shaft, driving connections between said conveyer drive shafts including planetary gears movable about the axis of one of said drive shafts, and means for supporting said planetary gears and moving them about the axis of the first-mentioned drive shaft for adjusting the timed relations between said first and second conveyor drive shafts.

3. In a machine of the character described, the combination with a conveyor power-driven drive shaft, of another conveyor drive shaft, driving connections between said conveyer drive shafts including planetary gears movable about the axis of one of said drive shafts, means for supporting said planetary gears and imparting thereto their planetary movements whereby the timed relations between said conveyor drive shafts may be adjusted, and other conveyor drive shafts connected to and driven by the first-mentioned and second-mentioned drive shafts respectively.

4. In a machine of the character described, the combination with sheet-folding means, of a conveyer for positively gripping a sheet and moving it over a normal path into position to be operated upon by said folding means, means for releasing a sheet from the sheet-gripping conveyer, and means operated together with said releasing means for deflecting said sheet before it reaches folding position.

5. In a machine of the character described, the combination with sheet-folding means, of a conveyer for positively gripping a sheet and moving it over a normal path into position to be operated upon by said folding means, means for releasing a sheet from the sheet-gripping conveyer, and means operated together with said releasing means for deflecting said sheet before it reaches folding position, said deflecting means including a bridge guide normally in position to have a sheet conveyed thereover into sheet folding position and adapted when swung into a position across the normal path of said sheet to deflect it from said normal path and to render said releasing means operative.

6. In a machine of the character described, the combination with sheet-folding means, of a conveyer for positively gripping a sheet and moving it over a normal path into position to be operated upon by said folding means, means movable into and out of position for releasing a sheet from the sheet gripping conveyer, and cut-out means operated by the last mentioned means for deflecting said sheet before it reaches folding position.

7. In a machine of the character described, the combination with sheet-folding means, of a conveyer for positively gripping a sheet and moving it over a normal path into position to be operated upon by said folding means, means movable into and out of position for releasing a sheet from the sheet-gripping conveyer, and cut-out means operated by the last mentioned means for deflecting said sheet before it reaches folding position, said cut-out means comprising a bridge guide normally in position to support a sheet conveyed thereover into sheet folding position and adapted to be swung by the movement of said releasing means for deflecting said sheet from said normal path.

8. In a machine of the character described, the combination with sheet-folding means, of a sheet-gripping conveyer for moving a sheet over a normal path into position to be operated upon by said folding means, a gripper releasing cam movable into and out of position for releasing a sheet from the sheet gripping conveyer, a rock shaft, bridge guides carried by said rock shaft and movable thereby into and out of position to deflect said sheet out of said normal path before it reaches position to be folded, and a lever arm carried by said rock shaft and articulately engaging said cam.

9. In a machine of the character described, a sheet-folding blade, a front edge gripper for moving a sheet into sheet-folding position with respect to said blade, means for operating said gripper in one position to release a sheet in position to be folded and in another position corresponding to a transfer point before said sheet reaches folding position, a second front edge gripper traveling in a path in which it may cooperate with said folding blade in one position for folding the sheet and with the first front edge gripper in another position for transferring the sheet without folding, means for operating the second front edge gripper in positions corresponding respectively to the sheet-folding and transfer positions of the first-mentioned front edge gripper, and means for correlating the operations of said front edge grippers for the sheet-folding and sheet-transferring operations.

10. In a machine of the character described, a sheet-folding blade, a front edge gripper for moving a sheet into sheet-folding position with respect to said blade, means for operating said gripper to release a sheet in position to be folded, other means for operating said gripper to release a sheet in another position to be transferred before the sheet reaches folding position, a second front edge gripper traveling in a path which adapts it to cooperate with said folding blade in one position for folding a sheet or in another position with the first front edge gripper for transferring the sheet, means for operating the second front edge gripper to close on said sheet in each of said positions, means for retiming the travel of said front-edge grippers to cooperate for a sheet-folding or a sheet-transferring operation, and operating connections between said retiming means and the gripper-operating means for alternatively coordinating the grippers and the folding blade with the second-mentioned front-edge grippers.

11. In a machine of the character described, a sheet-folding blade, a sheet-engaging gripper for moving a sheet into sheet-folding position with respect to said blade, means for operating said gripper to release a sheet in position to be folded or in another position, a second sheet-engaging gripper traveling in another path and adjustable to different positions with respect to the first mentioned gripper for cooperating with said folding blade for folding the sheet or with the first mentioned gripper for transferring a sheet directly without folding it, a fixed cam for operating the first mentioned gripper for the folding operation, another cam movable into and out of position to operate the first mentioned gripper for transferring the sheet, and variable power connections for driving said grippers and automatically moving said movable cam.

12. In a machine of the character described, the combination of a sheet-folding blade arranged to fold a sheet at rest, folded edge gripping means movable into and out of a position to grip the folded edge presented by said folding blade, other folded edge gripping means movable into and out of position to receive the folded edge of a sheet from the first mentioned folded edge gripping means, means for cooperatively operating the first and second mentioned folded edge grippers whereby the folded edge is released by the first mentioned folded edge gripping means and gripped by the second mentioned folded edge gripping means, and means operatably connected to said gripper-operating means for opening and closing a passageway for said folded sheet between the path traveled by the first mentioned grippers and the path traveled by the second mentioned grippers.

13. In a machine of the character described, the combination of a sheet folding blade arranged to fold a sheet at rest, folded edge gripping means movable into and out of a position to grip the folded edge imparted by said folding blade, a second folding blade into folding position with respect to which said folded edge gripping means conveys said folded sheet, other folded edge gripping means movable into successive positions in which it may receive the once folded sheet from the first mentioned gripping means or the twice folded sheet from the second folding blade, a planetary movement for transmitting power to both the first and second mentioned folded edge gripping means, said planetary movement including planetary gears adapted by their planetary movements to shift one folded edge gripping means relatively to the other folded edge gripping means, and means under the control of said planetary movement for operating the second mentioned grippers.

14. In a machine of the character described, the combination of a sheet folding blade arranged to fold a sheet at rest, a second folding blade arranged to fold the folded sheet at rest, folded edge gripping means for receiving the folded edge of a sheet from the first mentioned folding blade and releasing said folded sheet in a position of rest to be folded by the second mentioned folding blade, other folded edge gripping means movable over a path partly coincident with the path of the first mentioned folded edge gripping means and partly coincident with the path of said second mentioned folding blade, means for operating the first mentioned folded edge grippers either in a position to deliver the once folded sheet directly to the second mentioned folded edge grippers or in a position to release the once folded sheet to come to rest in a position to be folded again by the second mentioned folding blade, and a planetary movement transmitting power to said folded edge gripping means and adjustable for controlling the alternative operations referred to.

15. In a machine of the character described, a sheet-folding blade, a front edge gripper for moving a sheet into sheet-folding position with respect to said blade, means for operating said gripper to release a sheet in position to be folded or at a transfer point before said sheet reaches folding position, a second front edge gripper traveling in a path in which it may cooperate with said folding blade in one position for folding the sheet in folding position or with the first front edge gripper for transferring the sheet at said transfer point, means for operating the second front edge gripper either when said sheet reaches the transfer point or folding position, and means for adjusting the relative positions of said grippers and timing the operations of said grippers.

16. In a machine of the character described, the combination of a sheet-folding blade arranged to fold a sheet at rest, another folding blade arranged to impart a second fold to said sheet, folded edge gripping means movable from a position in which it receives the folded edge from the first mentioned folding blade to a position in which it releases the folded sheet to be folded again by the second folding blade, sheet supports movable into and out of position to support the trailing portion of the once folded sheet, other gripping means adapted to receive the once folded edge from the first mentioned gripping means or the double folded edge from the second mentioned folding blade, means for cooperatively operating the first and second mentioned folded edge grippers whereby the once folded sheet is transferred from the first mentioned folded edge gripping means to the second mentioned folded edge gripping means or the twice folded sheet is presented to the second mentioned gripping means by the second folding blade, and means for cooperatively adjusting the first and second mentioned gripping means and shifting said movable sheet supports.

17. In a machine of the character described, the combination of a sheet folding blade arranged to fold a sheet at rest, folded edge gripping means movable into and out of a position to grip the folded edge presented by said folding blade, other folded edge gripping means movable into and out of position to receive the folded edge from the first mentioned gripping means, means for supporting the trailing portion of a sheet conveyed by the first mentioned folded edge gripping means, means for cooperatively operating the first and second mentioned folded edge grippers whereby the folded edge is released by the first mentioned folded edge gripping means and gripped by the second mentioned folded edge gripping means, and means operating with the gripper operating means for moving said trailing portion supporting means out of the path of a sheet during its transfer from the first to the second mentioned folded edge gripping means.

18. In a machine of the character described, a sheet-folding blade, a sheet engaging gripper for moving a sheet into sheet-folding position with respect to said blade, means for operating said gripper to release a sheet in position to be folded or in another position, a second sheet-engaging gripper traveling in another path and adjustable to different positions with respect to the first mentioned gripper for cooperating with said folding blade for folding the sheet or with the first mentioned gripper for transferring a sheet directly without folding it, a cam for operating the first mentioned gripper for releasing said sheet in suitable position to be folded by said folding blade, another cam movable into and out of position to operate the first mentioned gripper for transferring the sheet, variable power connections for driving said grippers and automatically moving said movable cam, and means movable with said movable cam during its movement into operating position for locking said folding blade against movement.

19. In a machine of the character described, a sheet-folding blade, a sheet-engaging gripper for moving a sheet into sheet-folding position with respect to said blade, means for operating said gripper to release a sheet in position to be folded or in another position, a second sheet-engaging gripper traveling in another path and adjustable to different positions with respect to the first mentioned gripper for cooperating with said folding blade for folding the sheet or with the first mentioned gripper for transferring a sheet directly without folding it, a fixed cam for operating the second mentioned gripper for the sheet-transferring operation, another cam movable into and out of position to operate the second-mentioned gripper for the sheet-folding operation, power connections for driving said grippers over their respective paths of travel, means operating thru said power connections for retiming one of said grippers with respect to the other of said grippers, and means operatably connecting said movable cam to said retiming means.

20. In a machine of the character described, a sheet-folding blade, a sheet-engaging gripper for moving a sheet into sheet-folding position with respect to said blade, means for operating said gripper to release a sheet in position to be folded or in another position, a second sheet-engaging gripper traveling in another path and adjustable to different positions with respect to the first mentioned gripper for cooperating with said folding blade for folding the sheet or with the first mentioned gripper for transferring a sheet directly without folding it, a fixed cam for operating the second mentioned gripper for transferring said sheet, another cam movable into and out of position to operate the second mentioned gripper for folding the sheet, power connections for driving said grippers, means for adjusting the relative positions of some elements of said power connections with respect to other elements thereof for retiming the movements of one gripper with respect to the other, and means operated by said adjusting means for shifting said movable cam from one position to the other.

21. In a folding machine comprising relatively adjustable sheet-conveyors, and sheet-folding means cooperating with one of said conveyors for folding a sheet, means for operating said conveyors in differently timed relations to each other, a source of power, and power connections for connecting said power source to said conveyors, said connections including planetary gearing adapted to adjust the timing relations between said conveyors.

22. In a folding machine, relatively adjustable sheet-folding sections adapted to impart successive folds to a sheet passing therethru, and means for operating said sections, said operating means including adjustable planetary gearing adapted to coordinate the operations of said sections in differently timed relations to each other.

23. In a folding machine, relatively adjustable sheet-folding sections operating in succession upon a sheet, trains of gears for operating said sections, one of said gear trains including adjustable planetary gearing for coordinating the movements of and changing the time relationships between said sheet-folding sections, and means under the control of the adjusting movements of said planetary gearing for transferring a sheet from one of said folding machine sections to the other without imparting a fold thereto.

24. A folding machine comprising relatively adjustable folding sections, a power shaft, fixed and movable gears on said power shaft and gear trains connecting said fixed and movable gears to said sections respectively, one of said gear trains including planetary gears adapted by their planetary movements to change the relative timing in the operations of said sections.

25. A folding machine comprising relatively adjustable folding sections, a power shaft, fixed and movable gears on said power shaft and gear trains connecting said fixed and movable gears to said sections respectively, one of said gear trains including planetary gears adapted by their planetary movements to change the relative timing in the operations of said sections, a sheet-conveyor in one of said sections connected to said power shaft independently of said gear trains, and a sheet conveyor in the other of said sections connected to said power shaft thru the gear train including said planetary gears.

26. A folding machine comprising relatively adjustable folding sections, a power shaft, fixed and movable gears on said power shaft and gear trains connecting said fixed and movable gears to said sections respectively, one of said gear trains including planetary gears adapted by their planetary movements to change the relative timing in the operations of said sections, said folding sections including sheet-conveyors driven respectively by said power shaft and by the train including said planetary gears.

27. In a folding machine, folding mechanism, a sheet-conveyor cooperating therewith, a second sheet-conveyor adapted to receive a sheet folded by said folding mechanism or to receive a sheet from the first mentioned sheet-conveyor at a transfer point distant from the folding mechanism, gears having positively geared connections with said conveyors respectively, other gears having geared connection with each other and with the first mentioned gears respectively, means for moving the rotary axes of the second mentioned gears to impart a relative rotation to the first mentioned gears, and means operated by the last mentioned means for controlling the transfer of a sheet from one of said conveyors to the other at the transfer point.

28. In a folding machine folding mechanism, a sheet-conveyor cooperating therewith, a second sheet-conveyor adapted to receive a sheet folded by said folding mechanism or to receive a sheet from the first mentioned sheet-conveyor at a transfer point distant from the folding mechanism, a power shaft for driving the first mentioned conveyor, a gear keyed to said shaft, another gear freely rotatable about the axis of said shaft, planetary gears meshing with the first mentioned gears respectively, means for revolving said planetary gears about the axis of said shaft, and means operated by said revolving means for controlling the transfer of a sheet from one of said conveyors to the other at the transfer point.

29. In a folding machine, folding mechanism, a sheet-conveyor cooperating therewith, a second sheet-conveyor adapted to receive a sheet folded by said folding mechanism or to receive a sheet from the first mentioned sheet-conveyor at a transfer point distant from the folding mechanism, a power shaft for driving the first mentioned conveyor, a gear chain including a planetary movement for connecting said power shaft to the second mentioned conveyor, means for operating said planetary movement to impart a relative shift between said conveyors, and means under the control of said planetary movement operating means for transferring a sheet from one of said conveyors to the other at the transfer point.

30. In a folding machine, a sheet-conveyor provided with traveling grippers, a folding blade, a second sheet-conveyor provided with traveling grippers, a folding blade arranged to operate upon a sheet released by the first mentioned grippers and to present the folded edge to the second mentioned grippers, means for releasing a sheet from the first mentioned grippers in suitable position to be folded by said folding blade, other means for releasing said sheet at a transfer point distant from said folding blade, a shaft for driving one of said conveyors, a gear keyed to said shaft, a gear freely journaled on said shaft, geared connections between the last mentioned gear and the other conveyor, and planetary gears rotating in unison with each other and meshing respectively with said keyed and freely journaled gears, said planetary gears being adapted by their planetary movements to adjust the grippers of one of said conveyors relatively to the grippers of the other of said conveyors for transferring the sheet at the transfer point or for releasing said sheet in position to be folded by said folding blade.

31. In a folding machine, a sheet-conveyor provided with traveling grippers, a folding blade, a second sheet-conveyor provided with traveling grippers, a folding blade arranged to operate upon a sheet released by the first mentioned grippers and to present the folded edge to the second mentioned grippers, means for releasing a sheet from the first mentioned grippers in suitable position to be folded by said folding blade, other means for releasing said sheet at a transfer point distant from said folding blade, a gear train including a planetary system for connecting said conveyors, means for imparting a planetary movement to the planetary gears in said planetary system to adjust the grippers of one of said conveyors with respect to the grippers of the other of said conveyors, and sheet-guiding fingers operated by said planetary movement for opening and closing a direct path for the sheet to pass from one conveyor to the other at said transfer point.

32. In a folding machine, a sheet-conveyor provided with traveling grippers, a folding blade, a second sheet-conveyor provided with traveling grippers, a folding blade arranged to operate upon a sheet released by the first mentioned grippers and to present the folded edge to the second mentioned grippers, means for releasing a sheet from the first mentioned grippers in suitable position to be folded by said folding blade, other means for releasing said sheet at a transfer point distant from said folding blade, a gear train including a planetary system for connecting said conveyors, means for adjusting said planetary system to adapt said sheet-conveyors to be shifted relatively to each other from one to the other of their cooperative relationships, a rock shaft adapted to be rocked by said planetary system-adjusting means, and sheet guides movable by said rock shaft to open and close a direct path for a sheet to pass from one conveyor to the other at the transfer point, means under the control of said rock shaft for operating the grippers of one of said conveyors at said transfer point, and means under the control of said planetary system adjusting means for operating the grippers of the other conveyor at said transfer point.

33. In a machine of the character described, a sheet-conveyor, means for supplying power thereto, another sheet-conveyor, a gear rotated by said power supplying means, a freely journaled gear coaxial with the first mentioned gears, planetary gears for transmitting power from the first mentioned gear to the second mentioned gear, means for transmitting power from said second mentioned gear to the second mentioned conveyor, means for imparting a planetary movement to said planetary gears, and means under the control of the last mentioned means for transferring a sheet from one to the other of said conveyors.

34. In a machine of the character described, a sheet-conveyor, a drive shaft therefor, means for supplying power to said shaft, another sheet-conveyor, a shaft for driving the second mentioned sheet-conveyor, a gear keyed to the first mentioned shaft, a second gear freely rotatable about the axis of the first mentioned shaft, planetary gears for transmitting power from the first mentioned gear to the second mentioned gear, means for transmitting power from said second mentioned gear to the drive shaft of the second mentioned conveyor, means for imparting planetary movements to said planetary gears, and means under the control of the last said means for transferring a sheet from one to the other of said conveyors.

35. In a machine of the character described, a sheet-conveyor, a drive shaft therefor, means for supplying power to said shaft, another sheet-conveyor, a shaft for driving the second mentioned sheet-conveyor, a folding blade arranged to operate upon a sheet conveyed into position by the second mentioned conveyor and to deliver the folded sheet to the first mentioned conveyor, a gear keyed to the first mentioned shaft, a second gear freely rotatable about the axis of the first mentioned shaft, planetary gears for transmitting power from the first mentioned gear to the second mentioned gear, means for transmitting power from said second mentioned gear to the drive shaft of the second mentioned conveyor, means for imparting a planetary movement to said planetary gears whereby said conveyors are adjusted relatively to each other, and means under the control of the last mentioned means for transferring a sheet from one to the other of said conveyors at a transfer point before reaching folding position or for positioning said sheet for the folding operation.

36. In a machine of the character described, a power driven sheet-conveyor, a gear rotated thereby, a second sheet-conveyor, planetary mechanism including a train of gears for transmitting power from said gear to the second mentioned sheet-conveyor, and means for operating said planetary mechanism whereby said conveyors are brought into cooperative relation for transferring a sheet from one to the other of said conveyors.

37. In a machine of the character described, a sheet-conveyor provided with traveling grippers, another conveyor provided with traveling grippers, shafts for driving said conveyors, means for supplying power to one of said shafts, a gear keyed to said power shaft, a freely journaled gear coaxial therewith, a planetary support mounted to swing about the axis of said power shaft, planetary gears journaled in said planetary support and transmitting power from said keyed gear to said freely journaled gear, said planetary gears being adapted by the planetary movements of said support to move the grippers of one conveyor into and out of cooperative relation to the grippers of the other conveyor, a gear keyed to the drive shaft of the second mentioned conveyor, an idler for transmitting power from said freely journaled gear to the gear keyed to the drive shaft of the second mentioned conveyor, and sheet guides movable by said planetary support into and out of position to guide said sheet in its passage from one conveyor to the other.

38. In a machine of the character described, a sheet-conveyor provided with traveling grippers, another conveyor provided with traveling grippers, means for driving one of said conveyors, power connections between said conveyors including differential mechanism adapted to change the timing of the grippers of one conveyor with respect to the grippers of the other conveyor, means for adjusting said differential mechanism for this purpose, sheet guides movable between positions corresponding respectively to the timed relations between the grippers of said conveyors, and means for connecting said differential mechanism adjusting means and said sheet guides.

39. In a machine of the character described, a sheet-conveyor provided with traveling grippers, a folding blade related thereto, another conveyor provided with traveling grippers, means for driving said conveyors, said means including power transmitting connections embodying differential mechanism arranged between said conveyors, said differential mechanism being adapted by a movement of adjustment to arrange the grippers of the second-mentioned conveyor to receive the folded edge of a sheet from said folding blade and by another movement of adjustment to arrange said grippers of the second-mentioned conveyor to receive a sheet directly from the grippers of the first-mentioned conveyor, fixed and movable cams for operating the grippers of one of said conveyors in connection with the folding and transfer operations respectively, movable and fixed cams for operating the grippers of the other conveyor in connection with the folding and transfer operations respectively, and means for adjusting said differential mechanism and moving said movable cams into and out of operative position.

40. In a machine of the character described, a sheet-conveyor provided with traveling grippers, a folding blade related thereto, another conveyor provided with traveling grippers, means for driving said conveyors, said means including power transmitting connections embodying differential mechanism arranged between said conveyors, means for adjusting said differential mechanism for moving the grippers of said conveyors from their relative positions during the folding operation to relative positions in which they cooperate at a transfer point, a fixed cam for operating the grippers of one of said conveyors in connection with the folding operation, a cam movable into and out of position to operate the last-mentioned grippers in connection with the transfer operation, movable and fixed cams for operating the grippers of the other of said conveyors in connection with the folding and transfer operations respectively, and means under the control of said differential-adjusting means for moving said movable cams into and out of operative position.

41. In a machine of the character described, a sheet-conveyor provided with traveling grippers, a folding blade related thereto, another conveyor provided with traveling grippers, means for driving one of said conveyors, power transmitting connections embodying differential mechanism arranged between said conveyors, said differential mechanism being adjustable to move the grippers of said conveyors into and out of cooperative relation at a transfer point distant from their positions when said folding blade folds a sheet, fixed and movable cams for operating the grippers of one of said conveyors in connection with the folding and transfer operations, movable and fixed cams for operating the grippers of the other of said conveyors in connection with the folding and transfer operations, sheet-guiding means movable between positions corresponding to sheet-folding and sheet-transferring operations, means for momentarily displacing said sheet-guiding means during the passage of grippers, means for adjusting said differential mechanism, and means under the control of said adjusting means for moving said movable cams into and out of operative position.

42. In a machine of the character described, a sheet-conveyor provided with traveling grippers, a folding blade related thereto, another conveyor provided with traveling grippers, cams for operating said grippers for the folding operation, means for driving the first mentioned conveyor, said means including power transmitting connections embodying differential mechanism arranged between said conveyors, means for adjusting said differential mechanism for timing the operations of the grippers of one conveyor with respect to the operations of the grippers of the other conveyor, cams movable by said differential adjusting means into and out of positions to operate said grippers for transferring a sheet from one conveyor to the other without folding, and means operated by said differential adjusting means for holding said folding blade inoperative.

43. In a machine of the character described, the combination with a folding blade, of a sheet-conveyor provided with traveling grippers, another conveyor provided with traveling grippers, power connections between said conveyors including differential mechanism adapted to retime the grippers of one conveyor relatively to the grippers of the other conveyor, a lever for adjusting said differential mechanism, a fixed cam for operating the grippers of one of said conveyors in connection with the folding operation, a cam movable into and out of position to operate the last-mentioned grippers in connection with the transfer operation, movable and fixed cams for operating the grippers of the other of said conveyors in connection with the folding and transfer operations, a rock shaft operated by said lever, and means operably connecting said rock shaft to said last named movable cam.

44. In a machine of the character described, the combination with a folding blade, of a sheet-conveyor provided with traveling grippers, another conveyor provided with traveling grippers, power connections between said conveyors including differential mechanism for retiming the movements of said grippers of one conveyor with respect to the grippers of the other conveyor, a lever for adjusting said differential mechanism, a rock shaft controlled by said lever, sheet guides movably connected to said rock shaft, means for operating the grippers of one conveyor for the folding operation, means actuated by said rock shaft for operating the grippers of the other conveyor for transferring a sheet from one conveyor to the other without folding, means for operating the grippers of the first-mentioned conveyor at the transfer point, and means for operating the grippers of the second-mentioned conveyor for the folding operation.

45. In a machine of the character described, the combination with a folding blade, of a sheet-conveyor provided with traveling grippers, a cam for operating said grippers to release a sheet in position to be folded, a cam movable into and out of position to operate said grippers ahead of the first-mentioned cam, movable sheet-guides normally arranged to support a sheet moving into position to be folded, a rock shaft operatably connected to said sheet-guides, a slotted lever keyed to said rock-shaft, another conveyor provided with traveling grippers, a cam movable into and out of position to operate the last-mentioned grippers to grip the folded edge of said sheet as it is presented by said folding blade, power connections between said conveyors including a planetary system whereby the grippers of the second-mentioned conveyor may be retimed to close upon the sheet as it is released by the grippers of the first-mentioned conveyor under the action of the first-mentioned movable cam, a lever for adjusting said planetary system, said lever having operating connections with said slotted lever, a cam for operating the grippers of the second-mentioned conveyor at the transfer point, and operating connections between said planetary adjusting lever and the movable cam for operating the grippers of the second-mentioned conveyor during the folding operation.

46. In a machine of the character described, the combination of a sheet-conveyor provided with traveling grippers, another conveyor provided with traveling grippers, power connections between said conveyors including differential mechanism whereby the grippers of one conveyor may be adjusted relatively to the grippers of the other conveyor for transferring a sheet from one conveyor to the other, a lever for adjusting said differential mechanism, sheet guides normally positioned to support a sheet moved by one of said conveyors and movably connected to said lever to be moved into sheet deflecting position, and cams connected to said lever, said cams being normally held thereby in inoperative position and moved into gripper operating positions by the adjustment of said differential mechanism.

47. In a machine of the character described, a sheet-conveyor provided with traveling grippers, a folding blade related thereto, another conveyor provided with traveling grippers, means for driving said conveyors including adjustable power transmitting connections between said conveyors whereby the grippers of said conveyors are moved from their relative positions during the folding operation to other relative positions in which they cooperate at a transfer point, cams for operating said grippers for the folding operation, one of said cams being movable into and out of operative position, other cams for operating said grippers at the transfer point, one of said other cams being movable into and out of operative position, means for adjusting said power transmitting connections, and means operated by said adjusting means for moving said movable cams.

48. In a machine of the character described, a sheet-conveyor provided with traveling grippers, a folding blade related thereto, another conveyor provided with traveling grippers, means for driving said conveyors, said means including power transmitting connections including a planetary system arranged between said conveyors, means for adjusting said planetary system for moving the grippers of said conveyors from their relative positions during the folding operation to relative positions in which they cooperate at a transfer point, means for operating said grippers in their relative positions for the folding operation, means for operating said grippers at the transfer point, sheet guides movable between sheet-folding and sheet-transferring positions, means operated by said adjusting means for moving said sheet guides and controlling the operation of portions of said gripper-operating means.

49. In a machine of the character described, a sheet-conveyor provided with traveling grippers, a folding blade related thereto, another conveyor provided with traveling grippers, means for driving one of said conveyors, adjustable power transmitting connections arranged between said conveyors, means for adjusting said power connections, whereby the grippers of said conveyors may be moved from their relative positions during the folding operation to other relative positions in which they cooperate at a transfer point, cams for operating said grippers in their relative positions for the folding operation, cams for operating said grippers at the transfer point, sheet guides movable between some of said cams being movable into and out of operative position, sheet-folding and sheet-transferring positions, and means operated by said adjusting means for moving said movable cams and sheet guides.

50. In a machine of the character described, a sheet-conveyor provided with traveling grippers, a first folding blade operating to fold a sheet and to present the folded edge thereto to said traveling grippers, a second folding blade, a fixed cam for operating said grippers to release the once folded sheet in position to be folded by said second folding blade, another conveyor provided with traveling grippers, means for driving said conveyors including adjustable power transmitting connections between said conveyors, means for adjusting said power connections for moving the grippers of said conveyors from their relative positions during the second folding operation to relative positions in which they cooperate to transfer a sheet at a transfer point, a cam movable into and out of position for operating the grippers of the second mentioned conveyor for the folding operation, a cam movable into and out of positions to operate the grippers of the first-mentioned conveyor at the transfer point, sheet guides movable between sheet-folding and sheet-transferring positions, and means operated by said adjusting means for moving said movable cams and sheet guides.

51. In a sheet-folding machine, the combination with cooperating sheet conveyors, each of said conveyors being provided with sheet-grippers, a folding blade arranged to fold a sheet released by the grippers of one conveyor and to deliver it to the grippers of the other conveyor, power connections for said conveyors including retiming mechanism for adjusting the grippers of one conveyor relatively to the grippers of the other conveyor whereby a sheet may be transferred from one conveyor to the other without a folding operation, means for shifting said retiming mechanism, and gripper-operating means operatably controlled by said retiming mechanism shifting means.

52. In a machine of the character described, the combination with a conveyor power-driven drive shaft, of another conveyor drive shaft, conveyors driven by said drive shafts respectively, grippers carried by said conveyors, driving connections between said conveyor drive shafts including planetary gears movable about an axis of planetary movement and thereby changing the timed relations between said conveyor drive shafts, a support for said planetary gears movable to and fro for this purpose, and means for actuating said grippers under their differently timed relations.

53. In a machine of the character described the combination with a conveyor power-driven drive shaft, of another conveyor drive shaft, sheet-gripping conveyors driven by said drive shafts, driving connections between said conveyor drive shafts including planetary gears movable about the axis of one of said drive shafts, means for supporting and moving said planetary gears about the axis of their planetary movement whereby the timed relations between said conveyor drive shafts may be adjusted, fixed and movable cams for operating the grippers of one of said conveyors for differently timed relations respectively, and movable and fixed cams for respectively operating the grippers of the other of said conveyors under correspondingly timed relations.

54. In a machine of the character described, the combination with sheet-folding means, of two sheet-conveyors, one of said conveyors being adapted to convey a sheet into position to be folded by said sheet-folding means, the other of said sheet-conveyors being adapted to have its timed relations adjusted with respect to said sheet-folding means and the first-mentioned sheet-conveyor, said second sheet-conveyor being further adapted in one of its timed relations to receive a sheet directly from the first-mentioned sheet-conveyor without being folded by said sheet-folding means and in another of its timed relations to receive the folded sheet from the sheet-folding means, and differential gear mechanism for retiming the movements of said sheet-conveying means to correspond to sheet-transfer and sheet-folding operations.

55. In a machine of the character described, the combination with two sheet-conveyors adapted to be cooperatively operated in differently-timed relations, of operating connections positively connecting said conveyors, and differential gear mechanism connected up to and operating thru said operating connections for retiming the movements of said sheet-conveyors to correspond to the differently timed relations in which they are adapted to cooperate.

56. In a machine of the character described, the combination with a conveyor provided with sheet-engaging grippers, of a sheet-support movable into and out of position to support a sheet moved by said grippers over a normal path of travel, and a cam movably connected to said sheet-support and movable into and out of position to operate said grippers for permitting the release of said sheet from said grippers and its deflection from said normal path of travel.

57. In a machine of the character described, the combination with a conveyor provided with sheet-engaging grippers, of a movable sheet-support normally positioned to support a sheet moved by said grippers over a normal path of travel, a movable cam normally positioned out of position to operate said grippers, and operating connections between said sheet support and cam whereby a movement of the latter into position to operate said grippers for releasing said sheet is coordinated with a movement of said sheet-support out of normal position to a position in which it extends across said normal path of travel.

58. In a machine of the character described, the combination with a conveyor provided with sheet-engaging grippers, of a sheet-support, a rock shaft for moving said sheet-support into and out of position to support a sheet moved by said grippers, and a cam movably connected to said rock-shaft, said connections between the sheet-support and cam being adapted to move said sheet-support out of sheet-supporting position while said cam is being moved thereby into position to operate said grippers.

59. In a machine of the character described, the combination with a conveyor provided with sheet-engaging grippers, of a rock shaft, a sheet-support carried by said rock shaft and movable thereby into and out of normal position to support a sheet moved by said grippers, a radial arm mounted on said rock shaft, a cam movably connected to said radial arm and movable into and out of position to operate said grippers, and a reciprocable support for said cam.

EDWIN W. GOODWIN.